US012767591B2

(12) United States Patent
Tada

(10) Patent No.: US 12,767,591 B2
(45) Date of Patent: *Oct. 20, 2026

(54) MANUFACTURING METHOD OF THE FUNCTIONAL MEMBRANE AND THE FUNCTIONAL MEMBRANE

(71) Applicant: KONICA MINOLTA, INC., Tokyo (JP)

(72) Inventor: Kazunari Tada, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 18/536,370

(22) Filed: Dec. 12, 2023

(65) Prior Publication Data

US 2024/0199477 A1 Jun. 20, 2024

(30) Foreign Application Priority Data

Dec. 14, 2022 (JP) ................................ 2022-199423

(51) Int. Cl.
*C03C 15/00* (2006.01)
*G02B 1/18* (2015.01)

(52) U.S. Cl.
CPC ................ *C03C 15/00* (2013.01); *G02B 1/18* (2015.01)

(58) Field of Classification Search
None
See application file for complete search history.

(56) References Cited

U.S. PATENT DOCUMENTS

2007/0159698 A1 7/2007 Taguchi et al.
2017/0146696 A1 5/2017 Hongo et al.
2020/0408960 A1 12/2020 Kasuya et al.
2022/0390836 A1* 12/2022 Singh ........................ G03F 7/40
(Continued)

FOREIGN PATENT DOCUMENTS

EP 4300141 A1 1/2024
JP 2008129192 A 6/2008
JP 2013084996 A 5/2013
(Continued)

OTHER PUBLICATIONS

English Translation of JP-2020-38311 A (Year: 2020).*
(Continued)

*Primary Examiner* — Shamim Ahmed
(74) *Attorney, Agent, or Firm* — Buchanan Ingersoll & Rooney PC

(57) ABSTRACT

A manufacturing method of a functional membrane which contains an inorganic material and has a fine uneven structure on a surface thereof, includes a single mask forming step and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, $10 \leq X \times Y$, and an average height from the lowest bottom surface of the protruding portions of the lowermost stair to the highest top surface of the protruding portions of the uppermost stair is 1 μm or less.

10 Claims, 10 Drawing Sheets

13(56) References Cited

U.S. PATENT DOCUMENTS

2024/0308902 A1* 9/2024 Tada ........................ C03C 17/23

FOREIGN PATENT DOCUMENTS

| | | | |
|---|---|---|---|
| JP | 2015212809 | A | 11/2015 |
| JP | 2020038311 | A | 3/2020 |
| JP | 2021006841 | A | 1/2021 |
| WO | 2022181283 | A1 | 9/2022 |

OTHER PUBLICATIONS

English translation of JP,08-334939,A (Year: 1996).*

Anon.: "Moss Scale", Wikipedia, Apr. 10, 2024, XP093156781, Retrieved from the Internet: URL:https://en.wikipedia.org/wiki/Mohs_scale. (8 pages).

The extended European Search Report issued on May 13, 2024, by the European Patent Office in corresponding European Application No. 23214832.0. (11 pages).

Office Action (Communication) issued on Jan. 13, 2026, by the European Patent Office in corresponding European Patent Application No. 23 214 832.0. (6 pages).

Office Action (Notice of Reasons for Refusal) issued on Jun. 2, 2026, by the Japanese Patent Office in corresponding Japanese Patent Application No. 2022-199423, and an English Translation of the Office Action. (10 pages).

* cited by examiner

MANUFACTURING METHOD OF THE FUNCTIONAL MEMBRANE AND THE FUNCTIONAL MEMBRANE

CROSS-REFERENCE TO RELATED APPLICATIONS

The entire disclosure of Japanese Patent Application No. 2022-199423 filed on Dec. 14, 2022 is incorporated herein by reference in its entirety.

TECHNICAL FIELD

The present invention relates to a manufacturing method of a functional membrane, and the functional membrane. In particular, the present invention relates to a manufacturing method of a functional membrane and the like in which a fine uneven structure that has high rub resistance, high durability and super water repellency is formed with a small number of times of forming a mask, which leads to cost reduction.

DESCRIPTION OF THE RELATED ART

So far, there has not existed an uneven structure which is excellent in rub resistance. Generally, uneven structures that are not visually recognized by human eyes are fine, and therefore do not have durability to, for example, rubbing.

For example, a manufacturing method of nanostructure using a sol-gel process involves wet processing, and thus results in weak adhesion, which leads to peeling by just a light rub resistance test. In addition, a manufacturing method using lithography or nanoimprinting leads to high cost since the manufacturing method involves a process in which samples should be processed one by one.

For example, a technique has been disclosed in which a mask itself is formed in a stair shape by photolithography or the like, and etching is performed through the mask to form a fine uneven structure (see JP-A-2013-084996 and JP-A-2008-129192).

Such a technique is useful for the fine uneven structure which has a height of 20 m or more and a structure of regular arrangement as a structure to be formed. However, the technique is not useful for the fine uneven structure which has a height of less than 20 am.

SUMMARY OF THE INVENTION

The present invention has been made in view of the above problem and situation. An object of the present invention is to provide a manufacturing method of a functional membrane in which a fine uneven structure that has high rub resistance, high durability and super water repellency is formed with a small number of times of forming a mask, which leads to cost reduction, and the functional membrane. In addition, another object of the present invention is, even if a base material has a high reflectance, to provide a manufacturing method of a functional membrane and the like in which both rub resistance and super water repellency are realized while maintaining low reflectance.

In order to solve the above problem, the present inventors have found the importance of performing a single mask forming step and an etching step while studying the causes of the above problem.

That is, the above-described problem according to the present invention is solved by the following means.

To achieve at least one of the abovementioned objects, according to an aspect of the present invention, a manufacturing method of a functional membrane reflecting one aspect of the present invention is a manufacturing method of a functional membrane which contains an inorganic material and has a fine uneven structure on a surface thereof, including:

a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 1 μm or less.

$$10 \leqq X \times Y \qquad \text{Formula (I)}$$

To achieve at least one of the abovementioned objects, according to an aspect of the present invention, a functional membrane reflecting one aspect of the present invention is a functional membrane which contains an inorganic material as a main component thereof and has a fine uneven structure on a surface thereof, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, an average height from the lowest bottom surface of the protruding portions of the lowermost stair to the highest top surface of the protruding portions of the uppermost stair is 1 μm or less, and a reflectance adjustment layer made of a material different from a material of an uneven layer having the fine uneven structure is formed between a base material and the uneven layer.

$$10 \leqq X \times Y \qquad \text{Formula (I)}$$

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
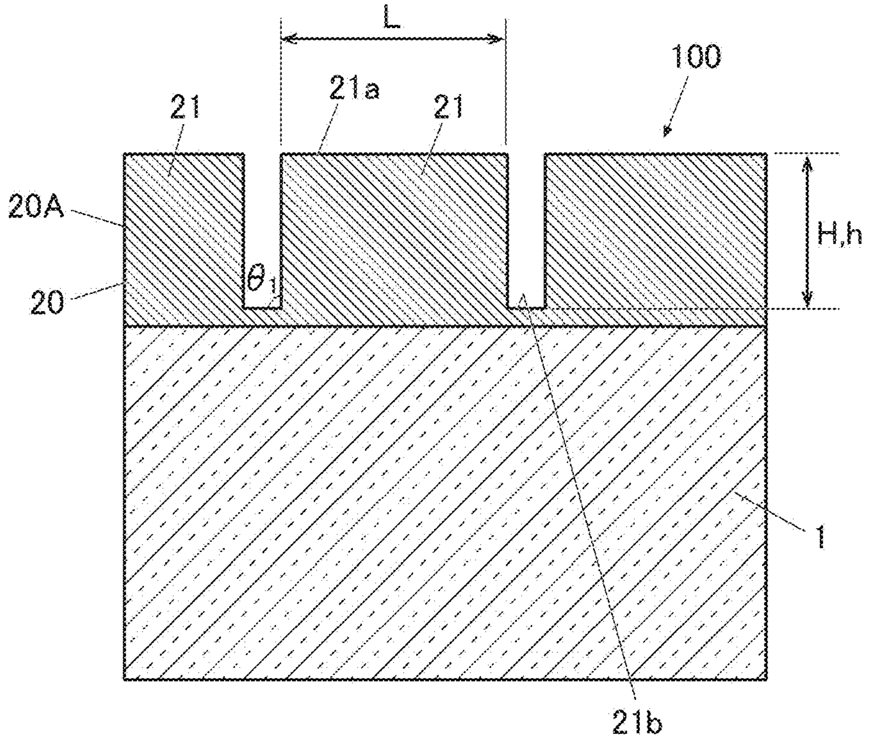
FIG. 1 is a schematic cross-sectional view illustrating an exemplary basic configuration of a functional membrane according to the present invention.

Hereinafter, one or more embodiments of the present invention will be described with reference to the drawings. However, the scope of the invention is not limited to the disclosed embodiments.

A manufacturing method of a functional membrane according to the present invention is a manufacturing method of a functional membrane which contains an inorganic material and has a fine uneven structure on a surface thereof, including:

a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 1 μm or less.

$$10 \leqq X \times Y \qquad \text{Formula (I)}$$

This feature is a common or corresponding technical feature among embodiments described below.

It is preferable that the manufacturing method of a functional membrane according to an embodiment of the present invention, further includes a step of forming a reflectance adjustment layer made of a material different from a material of an uneven layer having the fine uneven structure, between a base material and the uneven layer. In particular, it is preferable that a refractive index in the functional membrane is increased in the order of the uneven layer, the reflectance adjustment layer, and the base material. As a result, a functional membrane with a higher refractive index can be obtained.

It is preferable that at least a part of the plurality of protruding portions are formed in a mesh shape when the fine uneven structure is viewed from a top surface thereof. This makes it possible to realize both rub resistance and super water repellency.

Further, it is preferable that a water-repellent film which contains a water-repellent material and has a contact angle of 110 degrees or more with water under a condition of 23° C. and 50% RH is formed on an outermost top surface of the functional membrane. Accordingly, the present invention can be applied to an optical device having a super water repellency and requiring transparency.

It is preferable that a main component of the mask is a metal, before forming the mask, a compound that reacts with the metal is disposed on a layer that will be adjacent to the mask, and the mask is formed such that the mask has contact with the compound that reacts with the metal. Accordingly, the compound reacting with the metal chemically reacts with the metal in the mask. As a result, the metal in the mask moves, and the mask is formed in a mesh shape by self-assembly without being heated or the like. Therefore, it is possible to use resin or the like which cannot be heated at high temperature as a material of the base material, thereby reducing the cost. In addition, since no heating is required, the time is shortened, which also leads to energy saving.

It is preferable that the compound that reacts with the metal contains sodium (Na). This makes it easier for the metal in the mask to move.

Further, it is preferable that the compound that reacts with the metal has hygroscopicity. As a result, when the vacuum is released and returned to the atmosphere, the compound absorbs moisture in the atmosphere and moves, so that the movement of the metal in the mask is liable to occur.

Further, it is preferable that in the etching step, an anisotropic etching condition and an isotropic etching condition are combined. Thus, even in the single mask forming step, it is possible to easily form a fine uneven structure in a stair shape.

A functional membrane according to the present invention is a functional membrane which contains an inorganic material as a main component thereof and has a fine uneven structure on a surface thereof, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, an average height from the lowest bottom surface of the protruding portions of the lowermost stair to the highest top surface of the protruding portions of the uppermost stair is 1 μm or less, and a reflectance adjustment layer made of a material different from a material of an uneven layer having the fine uneven structure is formed between a base material and the uneven layer.

$$10 \leqq X \times Y \quad \text{Formula (I)}$$

This makes it possible to obtain a functional membrane having a fine uneven structure that has strong rub resistance and high durability. In addition, even when a refractive index of a base material is higher, the functional membrane can have high durability and low reflectance.

Hereinafter, the present invention, its constituent elements, and embodiments and aspects for carrying out the present invention will be described. In the present application, "–" is used to include numerical values described before and after "–" as the lower limit value and the upper limit value.

Summary of Manufacturing Method of the Functional Membrane According to the Present Invention A manufacturing method of a functional membrane according to the present invention is a manufacturing method of a functional membrane which contains an inorganic material and has a fine uneven structure on a surface thereof, including: a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 1 μm or less.

$$10 \leqq X \times Y \quad \text{Formula (I)}$$

First, a functional membrane manufactured by a functional membrane manufacturing method according to the present invention will be described.

In the present invention, the "fine uneven structure" is a structure having a plurality of fine uneven shapes capable of exhibiting a water-repellent action. The fine uneven structure is a structure having a plurality of fine uneven shapes in which at least an average height of the protruding portion is 1 μm or less when the lowest bottom surface of a concave portion is taken as a reference, that is, an average depth of the concave portion is 1 μm or less.

A layer having a fine uneven structure is referred to as an "uneven layer".

One or more stairs of the protruding portions according to the present invention have a distance of a substantially horizontal plane part thereof (an average diameter L of FIG. 1 in the case of one stair, and $L_3$ of FIG. 2 in the case of more stairs) that is 10 nm or more. It is preferably 30 nm or more, and particularly preferably in the range of 50 to 500 nm. In addition, the angle of the substantially horizontal plane part of the stairs formed with the vertical direction (an angle $\theta_1$ in FIG. 1 in the case of one stair, and an angle $\theta_2$ in FIG. 2 in the case of more stairs) is in the range of 60 to 140 degrees. A preferable range of the angle is in a range of 70 to 120 degrees.

Further, in the case of the multi-stair structure, in particular, it is preferable that at least one of the protruding portions satisfies any one of the following conditions (1) to (3). In particular, it is more preferable that all of the following conditions (1) to (3) are satisfied.

(1) In the vertical cross section of the fine uneven structure, the average height (e.g., $h_2$ in FIG. 2) of the protruding portion of the upper stair of the adjacent stairs is 10 nm pr more.

(2) When the fine uneven structure is viewed from a top surface thereof, the difference between an average diameter (for example, $L_2$ in FIG. 2) of the protruding portion of the upper stair of the adjacent stairs and an average diameter (for example, $L_1$ in FIG. 2) of the protruding portion of the lower stair of the adjacent stairs is 10 nm pr more.

(3) When the fine uneven structure is viewed from a top surface thereof, the difference between a ratio of a surface area of the protruding portion of the upper stair of the adjacent stairs and a ratio of a surface area of the protruding portion of the lower stair of the adjacent stairs is 5% or more.

In (1), the average height $h_2$ is preferably 30 nm or more and is particularly preferably in the range of 50 to 500 nm. Further, in (3), it is more preferable that the difference between the ratios of the surface areas is 10% or more.

The measurement can be performed by typical cross-sectional SEM observation or AFM observation, and the average value measured at 10 or more points satisfies the above-described condition.

The "lowest bottom surface of the protruding portions of the lowermost stair" refers to a surface included in the same reference plane as a reference plane including the "lowest bottom surface of a concave portion".

On the other hand, the "bottom surface of the protruding portions of the uppermost stair" described later refers to a surface included in the same surface as the bottom surface of the concave portion adjacent to the protruding portion of the uppermost stair.

Note that the above definitions will be described in detail in the explanation of the shape-observation using an atomic force microscope (AFM).

The definition of the above-mentioned "average height of the protruding portion", "average diameter of the protruding portion", and "ratio of a surface area of the protruding portion" will also be described later.

Figure 2:
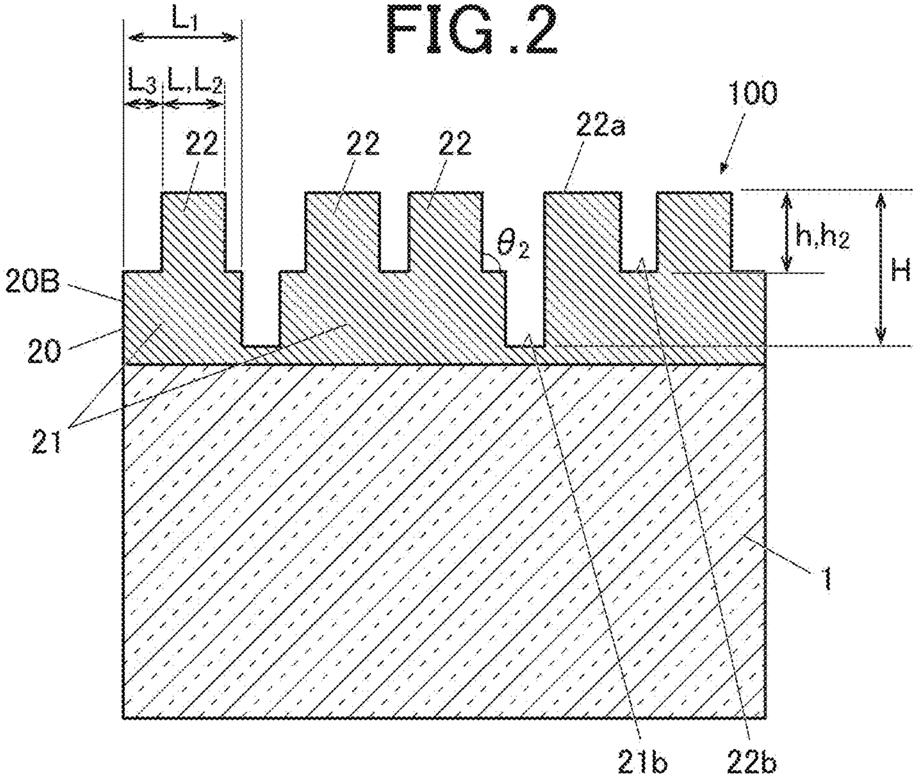
FIG. 2 is another schematic cross-sectional view illustrating an exemplary basic configuration of a functional membrane according to the present invention.

FIG. 1 and FIG. 2 are schematic cross-sectional views illustrating an exemplary basic configuration of a functional membrane according to the present invention.

As illustrated in FIGS. 1 and 2, a functional membrane 100 is formed on, for example, a base material 1 described later, contains an inorganic substance as a main component, and has a fine uneven structure 20A or 20B on the surface. The protruding portion of the fine uneven structure 20A or 20B is formed in a stair shape having one or more stairs in a vertical cross-sectional shape of the functional membrane along a thickness direction of the functional membrane, In the present invention, determination of whether or not the protruding portion of the fine uneven structure is formed in a stair shape having one or more stairs, and confirmation of the shape can be carried out as follows.

There are methods of observing cross-sectional shapes of three-dimensional images obtained by measurement using an atomic force microscope (AFM). Alternatively, it can be carried out under the conditions described below by using a method of electron-microscopic observation of a cross section of the functional membrane or a combination of both methods.

Specifically, FIG. 1 is a schematic cross-sectional view of a functional membrane having a protruding portion having a one-stair shape, and FIG. 2 is a schematic cross-sectional view of a functional membrane having a protruding portion having a two-stair shape. In FIG. 1, a functional membrane 100 having a fine uneven structure 20A which is formed of a plurality of one-stair protruding portions (protruding portions 21 of the first stairs), and includes an inorganic material is formed on a base material 1. The layer having the fine uneven structure 20A is also referred to as an uneven layer 20.

In addition, in FIG. 2, a functional membrane 100 having a fine uneven structure 20B which is formed of a plurality of two-stair protruding portions, and includes an inorganic material is formed on a base material 1. That is, the fine uneven structure 20B includes protruding portions 21 of the first stairs formed on the base material 1 and protruding portions 22 of the second stairs formed on the first stairs. The layer having the fine uneven structure 20B is also referred to as an uneven layer 20.

In the present application, "protruding portions 21 of the first stairs" are protruding portion formed on the side of the base material 1, and "protruding portions 22 of the second stairs" are protruding portions formed on the protruding portions 21 of the first stairs.

<Mohs Hardness>

Mohs hardness in the present invention uses a modified Mohs hardness that is modified in 15 levels.

When Mohs hardness of the inorganic material contained as a main component in the functional membrane is represented by X and the number of stairs of the protruding portions is represented by Y, the above equation (I) is satisfied. Preferably, $14 \leq X \times Y \leq 39$.

That is, when the number of the stairs of the protruding portions is one, that is, the protruding portions have a one-stair shape, an inorganic material whose Mohs hardness is 10 or more is contained. When the number of the stairs is 2 or more, an inorganic material whose Mohs hardness is 5 or more is contained.

Mohs hardness of typical inorganic materials are illustrated below.

TABLE I

| Modified Mohs hardness | Standard mineral name | Chemical composition | Hardness (HK) |
|---|---|---|---|
| 8 | Quartz or crystal | $SiO_2$ | 820 |
| 9 | Topaz | $Al_2(F, OH)_2(SiO_4)$ | 1340 |
| 10 | Garnet | $(Mg, Ca, Fe)_3(Al, Cr, Fe)_2(SiO_4)_3$ | 1360 |
| 11 | Molten zirconia | $ZrO_2$ | (1160) |
| | Tantalum carbide | TaC | 2000 |
| 12 | Corundum | $Al_2O_3$ | (2100) |
| | Tungsten carbide | WC | 1880 |
| 13 | Silicon carbide | SiC | 2480 |
| 14 | Boron carbide | $B_4C$ | 2750 |
| 15 | Diamond | C | 7000 |

The term "contains an inorganic material as a main component thereof" according to the present invention means that a ratio of the inorganic material in all of the components constituting the functional membrane is 80% by weight or more. Preferably, the ratio is 90% by mass or more and 99.9% by mass or less, particularly preferably 97% by mass or more and 100% by mass or less.

The inorganic material is not particularly limited as long as it satisfies Formula (I), but preferably contains at least an inorganic material having a Mohs hardness of 9 or more. Further, it is preferable that Mohs hardness contains 13 or more inorganic materials.

When the protruding portions of the fine uneven structure are in a one-stair shape (Y=1), the above-described Expression (I) requires Mohs hardness of the inorganic material should be 10 or more. Meanwhile, when the protruding portions of the fine uneven structure are in a two-stair shape, an inorganic material whose Mohs hardness is 5 or less may be contained. Examples of the inorganic material having a Mohs hardness of 9 or more include $Al_2(F, OH)_2(SiO_4)$, $(Mg, Ca, Fe)_3(Al, Cr, Fe)_2(SiO_4)_3$, $ZrO_2$, TaC, $Al_2O_3$, WC, SiC, $B_4C$, C, SiOC, and SiCN. It is particularly preferable to use $Al_2O_3$, SiC, SiOC, and SiCN.

Here, when the protruding portions of the fine uneven structure are in a one-stair shape, it is preferable to use SiC, SiOC or SiCN. The functional membrane using SiC, SiOC or SiCN is suitably used, for example, in an inkjet head or a mold.

When the protruding portion has two or more stairs (Y≥2), a transparent $SiO_2$ is preferably used, and specifically, such a functional membrane is preferably used for an optical device, for example.

In the present invention, it is preferable that the number of stairs (integer Y) of the protruding portion is 2, that is, the protruding portions are in a two-stair shape.

<Shapes of Protruding Portions and Randomness>

In the fine uneven structure according to the present invention, as a prerequisite condition or a preferable condition, the shape of the protruding portions, for example, a height, a size or the like thereof should be in a range defined by a condition as described later.

However, when the protruding portions in the fine uneven structure are observed as a whole, it is preferable that relative positional relationships among the plurality of the protruding portions and shapes of the plurality of the protruding portions have, in the range defined by the condition as described later, randomness in which identity or regularity with respect to periodicity is lacking. Such randomness makes it possible to prevent light diffraction.

The term "randomness" as used herein refers to a state where regarding relative positional relationships among the plurality of the protruding portions and shapes of the plurality of the protruding portions, randomness in which general identity, regularity with respect to periodicity or the like is lacking, or unpredictability is recognized in the formation of the protruding portions in the fine uneven structure under a condition in which control in a range defined by a condition about the shape as described later is a prerequisite. In addition, it refers to a state in which no diffracted light is generated.

In addition, it is more preferable from the viewpoint of compatibility between rub resistance and super water repellency that at least a part of the plurality of the protruding portions have a mesh shape when the fine uneven structure is viewed from a top surface thereof.

Here, "at least a part of the plurality of the protruding portions have a mesh shape" means that some protruding portions are connected continuously when viewed from a top surface thereof, and there is no non-connected part therein. In other words, a network-like shape is realized in a such manner that long axes of these protruding portions cannot be defined.

<Total Average Height>

In a vertical cross-sectional shape of the fine uneven structure along a thickness direction of the functional membrane, an average height from the lowest bottom surface of the protruding portions of the lowermost stair to the highest top surface of the protruding portions of the uppermost stair is 1 μm or less.

The term "average height from the bottom surface of the protruding portion to the top surface of the protruding portion (also referred to as "total average height H")" means, for example, the total depth of etching when the formed inorganic material layer are formed by etching in a vertical cross section (cross section in the thickness direction) of the fine uneven structure.

Specifically, when the protruding portions have a two-stair shape, as illustrated in FIG. 2, it refers to a distance H from a bottom surface (base end face) 21*b* of a protruding portion 21 of the first stair (lowermost stair) to the uppermost surface 22*a* of a protruding portion 22 of the second stair (uppermost stair).

Therefore, as illustrated in FIG. 14, it refers to a distance H obtained by excluding a thickness M2 of an unetched inorganic material layer 2 from a total thickness M1 of the inorganic material layer 2 formed by the manufacturing method of the functional membrane 100.

When the protruding portions have a one-stair shape, as illustrated in FIG. 1, it refers to a distance H from the bottom surface (base end face) 21*b* to the top surface 21*a* of the uppermost the protruding portion 21. In the same manner as described above, it refers to a distance H obtained by excluding a thickness M2 of an unetched inorganic material layer 2 from a total thickness M1 of the inorganic material layer 2 formed by the functional membrane manufacturing method of the functional membrane.

The total average height H is less than or equal to 1 μm, preferably in the range of 0.05-0.25 μm.

The total average height H can be calculated by an image analysis method using an atomic force microscope (Atomic Force Microscope: AFM) as described later.

In order to set the total average height to 1 micrometer or less, for example, a thickness of the inorganic material layer to be formed, the thickness of the metal mask, temperature for forming the membrane by the metal mask, etching time, and the like may be controlled as described later.

<Average Diameter, Ratio of Surface Area, and Average Height of Protruding Portion in Uppermost Stair>

When the fine uneven structure is viewed from a top surface thereof, the protruding portion of the uppermost stair preferably has an average diameter in a range of 10 to 500 nm.

In addition, it is preferable that a ratio of a surface area of the protruding portion of the uppermost stair to a surface area of the entire fine uneven structure is in a range of 30 to 70%.

Further, in the fine uneven structure, it is preferable that an average height from a bottom surface of the protruding portions of the uppermost stair to an uppermost surface of the protruding portions of the uppermost stair is 10 to 250 nm.

By setting the average diameter, the ratio of surface area, and the average height in the range, both rub resistance and super water repellency can be achieved.

The average diameter of the protruding portion of the uppermost stair is preferably in the range of 10 to 500 nm, and more preferably in the range of 50 to 200 nm.

The "average diameter of the protruding portion of the uppermost stair" is the average diameter of the protruding portion of the uppermost stair when the fine uneven structure is viewed from a top surface thereof, that is, when the entire fine uneven structure is photographed from the top surface of the functional membrane by an electron-microscope and the photograph is observed.

For example, as illustrated in FIG. 1, an average diameter L of the protruding portion 21 of the first stair (uppermost stair) is referred to as the average diameter L for a fine uneven structure 20A having protruding portions having a one-stair shape. In addition, as illustrated in FIG. 2, an average diameter L of the protruding portion 22 of the second stair (uppermost stair) is referred to as the average diameter L for a fine uneven structure 20B having protruding portions having a two-stair shape.

The average diameter L of the uppermost the protruding portion can be calculated by using free software for image processing of the taken photographed image after the photograph is taken by an electron microscope as described later. Examples of the free software for the image processing include "ImageJ (ImageJ1.32S created by WayneRasband)".

The ratio of surface area of the protruding portion of the uppermost stair to the total surface area of the entire fine uneven structure is preferably in the range of 30 to 70%, and more preferably in the range of 30 to 55%.

"When the fine uneven structure is viewed from a top surface thereof, the ratio of the uppermost the fine uneven structure to the total surface area of the protruding portion of surface area" is the ratio of surface area of the uppermost stair to surface area of the entire fine uneven structure when the fine uneven structure is viewed from a top surface thereof, that is, when the entire fine uneven structure is photographed from the upper surface with an electron microscope and the photograph is observed. Here, the "the entire fine uneven structure" refers to an entire area including all the protruding portion and concave portions.

The ratio of surface area of the protruding portion of the uppermost stair can be calculated by using free software for image processing for the taken image photograph after the photograph is taken by an electron microscope as described later.

Examples of the free software for image processing include "ImageJ (ImageJ1.32S created by WayneRasband)".

Alternatively, an AFM may be used to measure image data of the fine uneven structure to binarize the obtained AFM measured image using software manufactured by BRUKER and carry out the calculation.

If the AFM needle does not enter a narrow groove (concave portion), data for protruding portions in a one-stair shape is obtained even in the case of protruding portions in a two-stair shape. Therefore, it is preferable to select a super sharp or a cantilever for high aspect ratio as much as possible.

Furthermore, the average height from the bottom surface of the protruding portions of the uppermost stair to the top surface of the protruding portions of the uppermost stair is preferably in the range of 10 to 250 nm, more preferably in the range of 30 to 200 nm, in the case of a one-stair shape. In the case of a two-stairs shape, it is preferably in the range of 10 to 150 nm, and more preferably in the range of 30 to 100 nm. In the case of a three-stair shape, it is preferably in the range of 10 to 100 nm, and more preferably in the range of 20 to 50 nm.

"The average height (also referred to as "average height h") from the bottom surface of the protruding portions of the uppermost stair to the outermost surface of the protruding portions of the uppermost stair" means, for example, as illustrated in FIG. 2, in the case of a fine uneven structure 20B having protruding portions having a two-stair shape, a distance h from the lowest bottom surface 22*b* of a protruding portion 22 of the second stair (the uppermost stair) to the outermost surface (the uppermost surface) 22*a* of the protruding portion 22 of the second stair (the uppermost stair) in the vertical cross-section (section along a thickness direction) of the fine uneven structure.

Incidentally, in the case of a fine uneven structure 20A having protruding portions having a one-stair-shape, it means a distance h from the lowest bottom 21*b* of a protruding portion 21 of the first stair (uppermost stair) to the uppermost surface 21*a*. Therefore, it becomes the same as the total average height H described above.

The average height h from the bottom surface of the uppermost the protruding portion to the top surface of the uppermost the protruding portion can be calculated by using an atomic force microscope or by observing the cross section of the protruding portion with a SEM as described later.

In order to make the average diameter L, the ratio of the surface area, and the average height h of the protruding portion of the uppermost stair in the above range, the thickness of the formed inorganic material layer may be controlled. In addition, as will be described later, a thickness of the inorganic material layer to be formed, the thickness of the metal mask, temperature for forming the membrane by the metal mask, etching time, and the like may be controlled as described later.

Further, when the fine uneven structure is viewed from the top surface of the functional membrane, a ratio of the major axis diameter and the minor axis diameter (major axis diameter/minor axis diameter) of at least a part of the plurality of the protruding portions is preferably 2 or more in view of durability. The ratio is more preferably 5 or more. Specifically, for example, when viewed from a top surface thereof, it is preferable to have a shape such as an L-shape rather than a perfect circle.

Here, the "major axis diameter of protruding portions" means a diameter of the smallest circumscribed circle C1 which is drawn for the protruding portion when the fine uneven structure is observed by SEM following the "method for calculating an average diameter of a protruding portion of the outermost stair" described later is used. The "minor axis diameter of protruding portions" means a diameter of the largest inscribed circle C2 which is drawn for the protruding portion.

The protruding portion whose ratio of the major axis diameter to the minor axis diameter is 2 or more may be the protruding portion of the first stair or the protruding portion of the second or further stair. It is preferable that any protruding portion of the first stair or the second or further stair has such a ratio since it is excellent in durability. In practice, it is preferable that the protruding portion of the first stair has such a ratio.

In addition, when the fine uneven structure is viewed from a top surface thereof, the average diameter of the protruding portion of the uppermost stair is preferably smaller than the average diameter of the protruding portion of the stair which is lower than the protruding portion of the uppermost stair. This makes it possible to achieve both super water repellency and rub resistance.

For example, as illustrated in FIG. 2, the average diameter L of the protruding portion 22 of the uppermost stair (second stair) is preferably in the range of 10 to 500 nm for a fine uneven structure 20B having the protruding portions having a two-stair shape as described above. The average diameter of the protruding portion 21 of the lower (first) stair is preferably in the range of 100 to 1000 nm.

In the three-stair shape, the average diameter of the protruding portion of the uppermost stair (third stair) is preferably in the range of 10 to 500 nm range as described above. The average diameter of the protruding portion of the middle (second stair) is preferably in the range of 100 to 600 nm. The average diameter of the protruding portion of the lowest stair (first stair) is preferably in the range of 100 to 1000 nm.

The method for calculating the average diameter of the protruding portion of the lower stair may be calculated by the method described above before forming the protruding portion of the upper stair.

The protruding portion 21 and the protruding portion 22 may be formed regularly, but are preferably randomly formed as described above. By being randomly formed, it is possible to prevent optical diffraction when the functional membrane is applied to an optical device.

<Calculation Method of Average Diameter of Protruding Portion of Uppermost Stair>

The average diameter of the protruding portion of the uppermost stair can be calculated from an image photograph which is obtained by taking a photograph of the fine uneven structure using scanning electron microscopy (Scanning Electron Microscope, SEM) or transmission electron microscopy (Transmission Electron Microscope; TEM) and by carrying out the calculation about the taken image photograph using free software for image processing. Examples of the free software for image processing include "ImageJ (ImageJ1.32S created by WayneRasband)".

The sequence of image analysis by electron-micrograph (SEM) will be described below.

1) The free software, ImageJ is downloaded.
2) Image processing is performed according to the following procedure while the initial setting is maintained.
3) An SEM image of a surface of the fine uneven structure which is taken beforehand by a scanning electron-microscope at a magnification of 30000 times or more is read into a personal computer using the free software, ImageJ.

Figure 3:
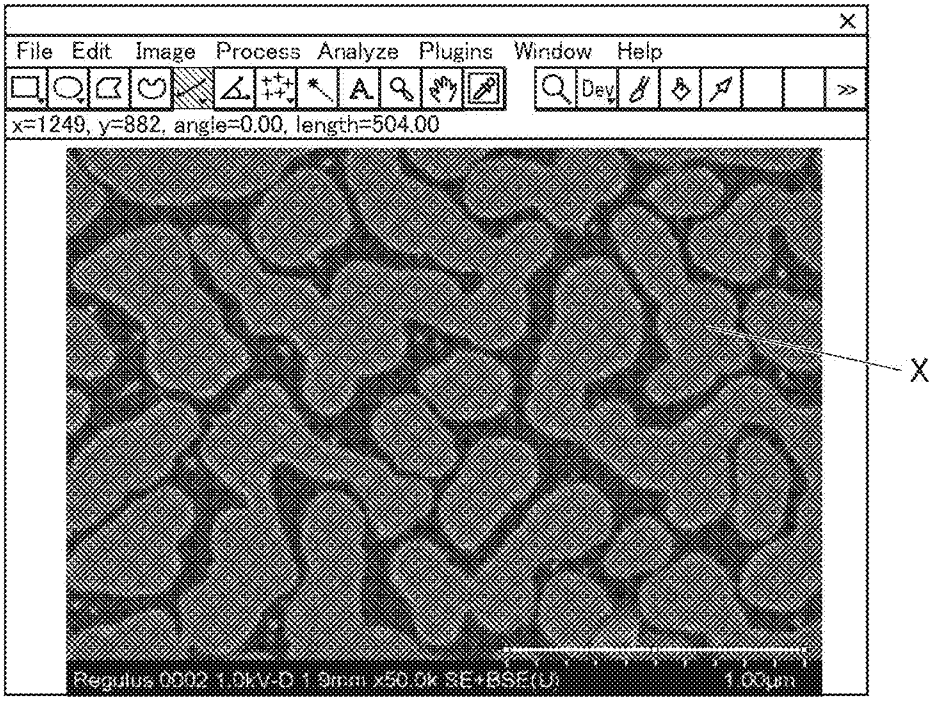
FIG. 3 is a diagram for describing a calculation method of an average diameter of a protruding portion of the uppermost stair, and illustrates an example of an operation of photographic image analysis by an electron-microscope.

4) The number of pixels is correlated with physical lengths. For example, in the case of FIG. 3, 1 μm=504 pixels.

5) A major axis diameter is measured.

Figure 4:
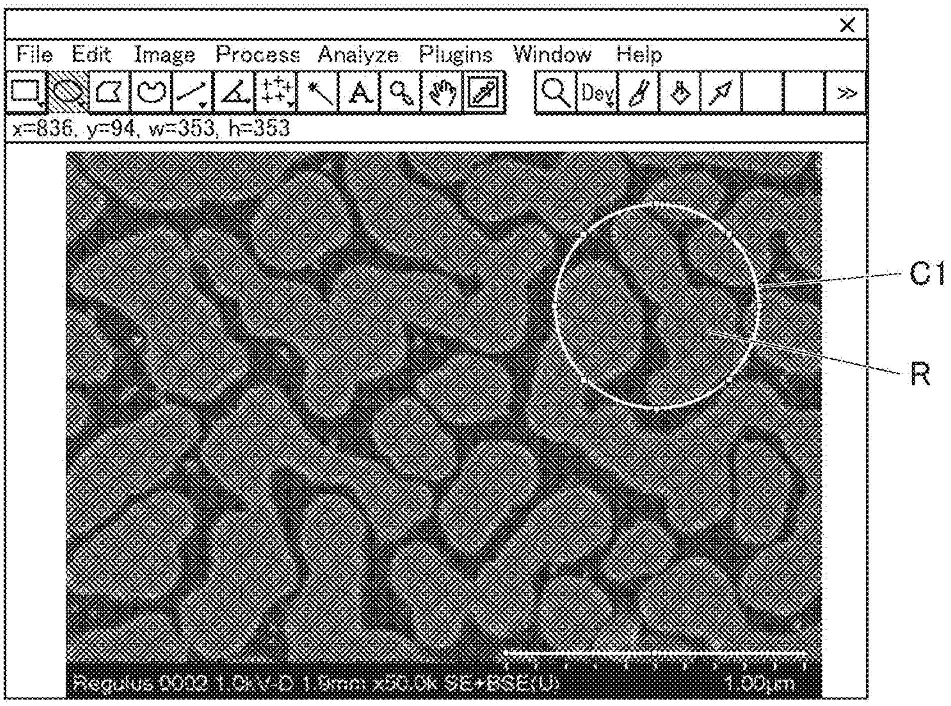
FIG. 4 is a diagram for describing a calculation method of an average diameter of a protruding portion of the uppermost stair, and illustrates an example of an operation of photographic image analysis by an electron-microscope.

As illustrated in FIG. 4, for a given particle (e.g., particle R), the least circumscribed circle C1 is written using a circle graphics tool. Here, w=h=353 above is the number of pixels indicating the diameter (major axis diameter) of the smallest circumscribed circle C1. That is, the physical length is 353/504=0.700 μm.

6) A minor axis diameter is measured.

Figure 5:
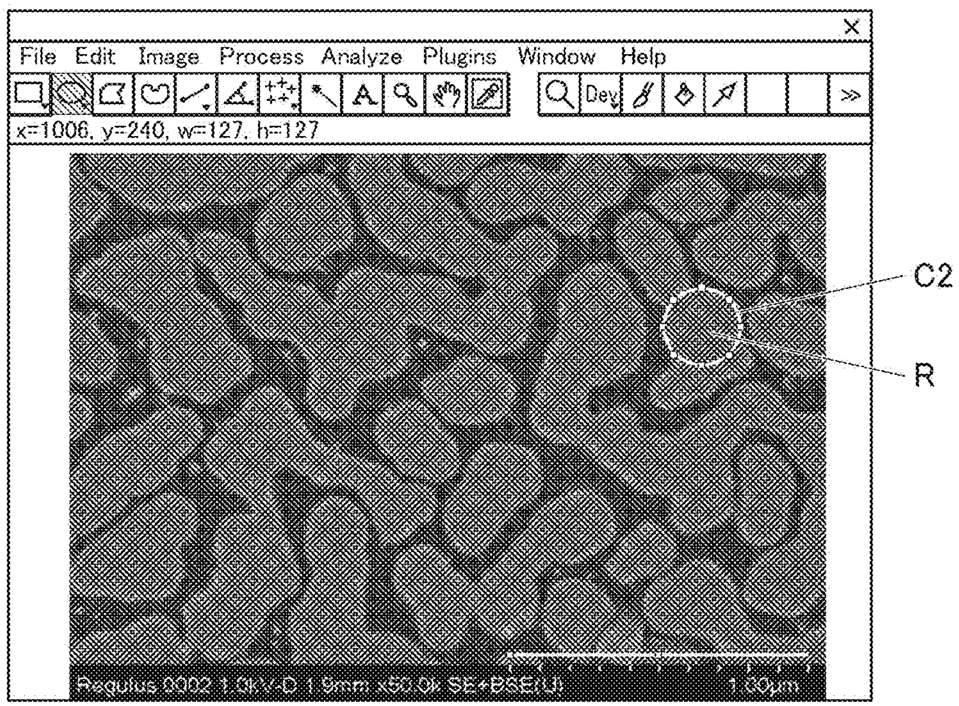
FIG. 5 is a diagram for describing a calculation method of an average diameter of a protruding portion of the uppermost stair, and illustrates an example of an operation of photographic image analysis by an electron-microscope.

As illustrated in FIG. 5, the maximum inscribed circle C2 is written for the particle R using a circle graphics tool. Here, w=h=127 above is the number of pixels indicating the diameter (minor axis diameter) of the largest inscribed circle C2. That is, the physical length is 127/504=0.251 μm.

7) An average diameter is calculated.

An average of the measured major axis diameter and minor axis diameter is calculated.

Specifically, (0.700+0.251)/2=0.475 μm is referred to as the diameter of the particle R illustrated in FIG. 5.

In this way, the diameters of 10 arbitrary particles are calculated in the same manner, and the average value of 10 diameters is taken as the average diameter as a representative of the sample.

<Ratio of Surface Area of Protruding Portion of Uppermost Stair>

The ratio of a surface area of the protruding portion of the uppermost stair to a surface area of the entire fine uneven structure is calculated by performing structural analysis on the taken image photograph by SEM using free software for image processing. Examples of the free software for image processing include "ImageJ (ImageJ1.32S created by WayneRasband)". Alternatively, an AFM may be used to measure image data of the fine uneven structure to binarize the obtained AFM measured image using software manufactured by BRUKER and carry out the calculation.

In the present invention, both an image analysis method using a SEM and an image analysis method using an AFM can be used. The value calculated by any of the image analysis methods may fall in the range defined in the present invention.

(Image Analysis by SEM)

Hereinafter, a procedure of image analysis by an electron micrograph will be described.

1) An SEM image of a surface of the fine uneven structure which is taken beforehand by a scanning electron-microscope (SEM) at a magnification of 30000 times or more is read into a personal computer using the free software, ImageJ. Preferably, the SEM image is not contrived since it varies with focus, contrast, and brightness adjustments.

2) Setting of definition of black and white is made.

In the free soft, ImageJ, when a check sign is entered in Black Background, it is set that black is represented by the luminance value 0 and white is represented by the luminance value 255. When a check sign is not entered in Black Background, it is set that white is represented by the luminance value 0 and black is represented by the luminance value 255. In the present analysis, a check sign is entered for the analysis (i.e., white is represented by the luminance value 255).

3) Noise of the image is removed.

A smooth (smooth) process is performed.

4) A bandpass filter is adapted.

It is recommended that a bandpass filter value is set to be, for example, 20 to 100. This setting depends on the default SEM image, and thus it is preferable to make the setting appropriately and optimally.

5) The image is binarized.

Conversion to 8 bits is performed by the setting, and a threshold is set. The threshold is set to the right end of the bar so that the above bar (an area selected in green) in the setting below is 0%. The threshold is adjusted until the below bar (an area selected in blue) overlaps black areas corresponding to pores.

Since this threshold varies according to contrast of the image, it is preferable that the threshold is set each time by an operator performing the analysis, rather than fixed.

Figure 11A:
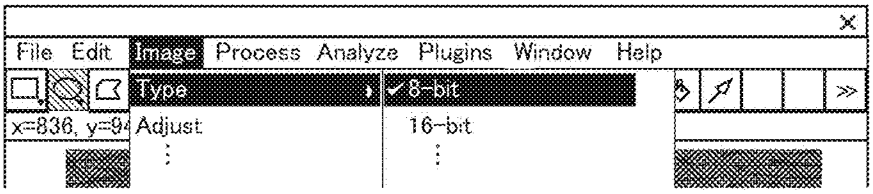
FIGS. 11A and 11B are diagrams for describing a calculation method of a ratio of a surface area of the uppermost stair of a protruding portion and illustrate an exemplary operation of photographic image analysis by an atomic force microscope.
Figure 11B:
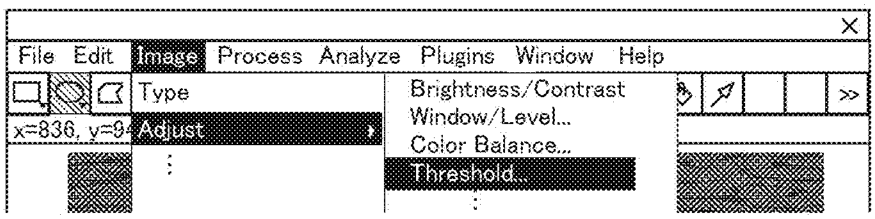
Figure 11C:
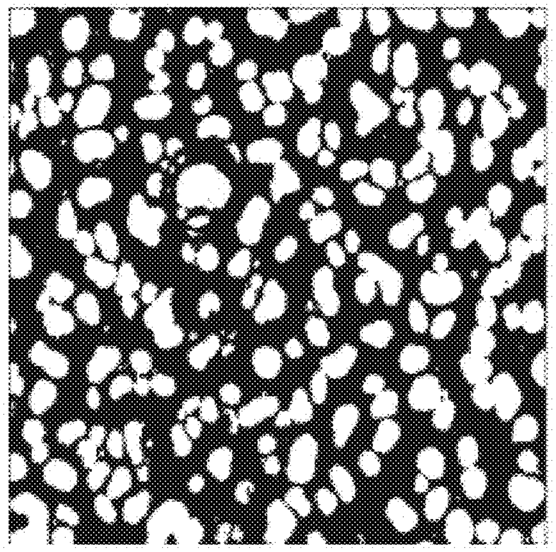
FIG. 11C illustrates binarized data by an atomic force microscope.

When the threshold is set, conversion to a black/white image is performed. For example, in the binarized image illustrated in FIG. 11C, the white portions are the protruding portions of the uppermost stair (e.g., the protruding portion 22 of the second stair in FIG. 2), and the black portions are the other portions (e.g., the protruding portion 21 of the first stair in FIG. 2) in which the protruding portions 22 of the uppermost stair are excluded.

Figure 6:
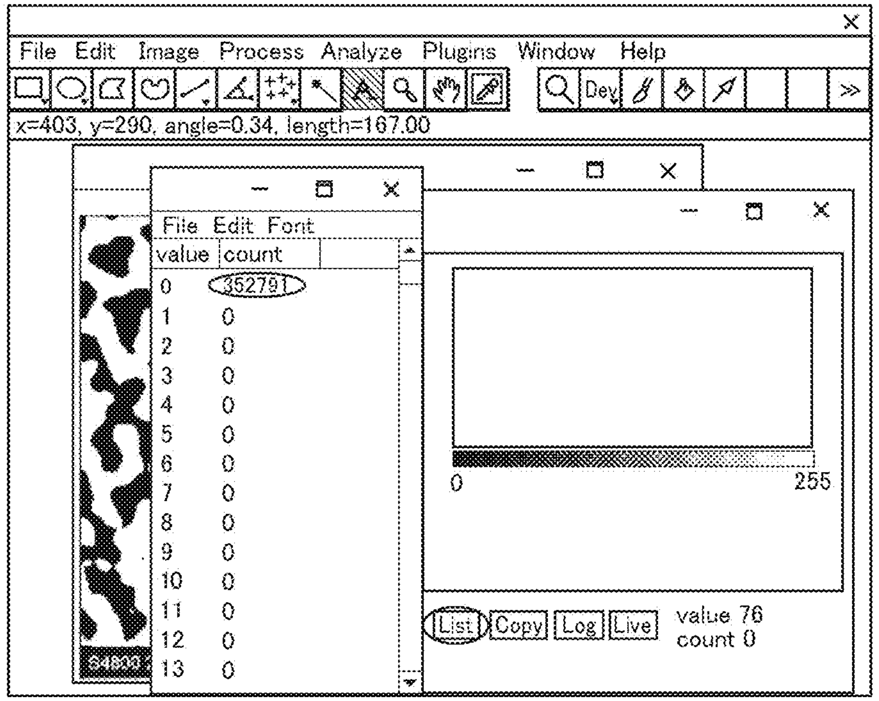
FIG. 6 is a diagram for describing a calculation method of a ratio of a surface area of the uppermost stair of a protruding portion and illustrates an example of operation of photographic image analysis by an electron-microscope.
Figure 7:
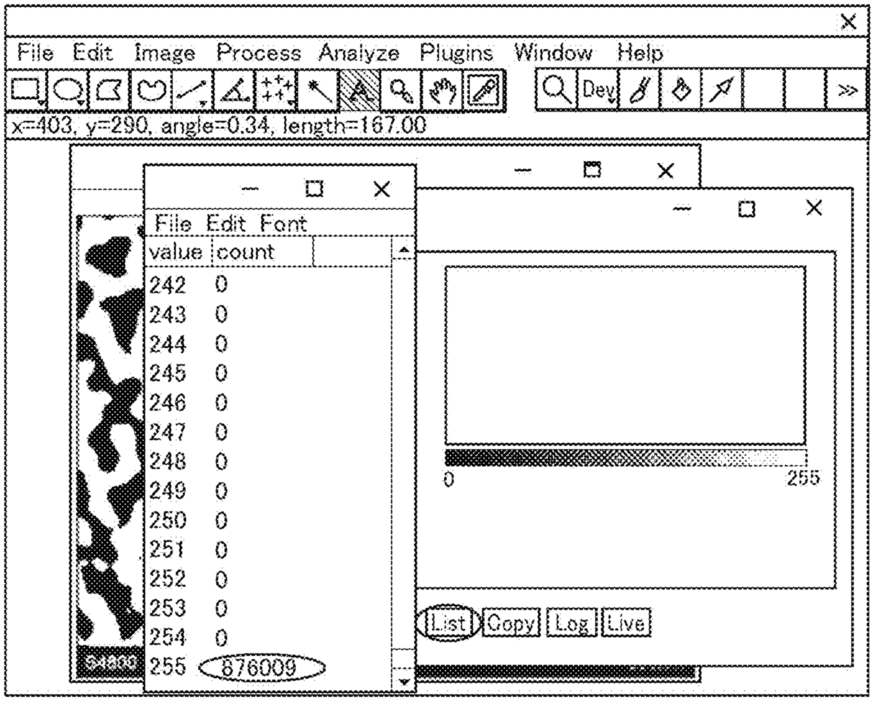
FIG. 7 is a diagram for describing a calculation method of a ratio of a surface area of the uppermost stair of a protruding portion and illustrates an example of operation of photographic image analysis by an electron-microscope.

6) The histogram is called by operating ImageJ (see FIGS. 6 and 7).

The histogram is displayed, and then, the List button indicated by a round in FIG. 6 is pressed using a mouse for displaying data of the histogram in a listing form, which leads to display of the number of pixels for each grayscale.

In FIG. 6, it is indicated that the number of Value=0 (i.e., black pixels) is 352791.

Similarly, in FIG. 7, it is indicated that the number of Value=255 (i.e., white pixels) is 876009.

7) The ratio of the area is calculated.

The protruding portions of the uppermost stair correspond to white pixels, which leads to the number of white pixels/(number of white pixels+number of black pixels)=the ratio of the area of the protruding portions of the uppermost stair to the whole.

In FIG. 6 and FIG. 7, {876009/(352791+876009)}×100=71% is the ratio of the area of the protruding portions of the uppermost stair.

When information at the time of measuring SEM image is included in the analysis image, it is preferable to perform the image analysis after a step of removing it in advance so as not to affect the analysis.

(Image Analysis by AFM) Next, the sequence of image analysis by an atomic force microscope (AFM) will be described.

An atomic force microscope (AFM) is a type of scanning probe microscopy (SPM) that uses atomic forces between a sample and a stylus to measure nano-level textures.

Specifically, an AFM brings a cantilever with a sharp probe attached to the end of a minute spring plate closer to several nm from the sample surface. Then, the unevenness of the sample is measured by the atomic force acting between the atom at the tip of the probe and the atom of the sample. The atomic force microscope (AFM) scans while feeding back a piezo scanner so that the atomic force becomes constant, that is, the deflection of the cantilever becomes constant. This is a method of measuring displacement along the Z-axis, that is, the uneven structure of the surface by measuring the amount of displacement fed back to the piezoelectric scanner.

In the present invention, a L-trace W manufactured by Hitachi High-Technology Co., Ltd. was used as an atomic force microscope (AFM). As the probe, SI-DF40P2, which is a silicon probe manufactured also by Hitachi High-Technology Co., Ltd., was used.

A) Obtaining Uneven Image of Fine Uneven Structure by AFM

Figure 8A:
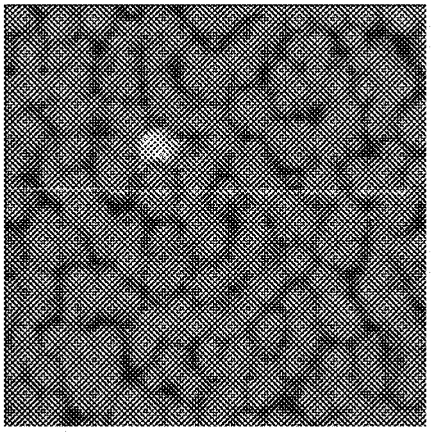
FIGS. 8A and 8B are diagrams for describing a calculation method of a ratio of a surface area of the uppermost stair of a protruding portion and illustrate photographic images and binarized data by an atomic force microscope.

Using the above atomic force microscope (AFM), a three-dimensional uneven image of the fine uneven structure of the functional membrane is measured (see FIG. 8A).

B) Binarization of AFM

Figure 8B:
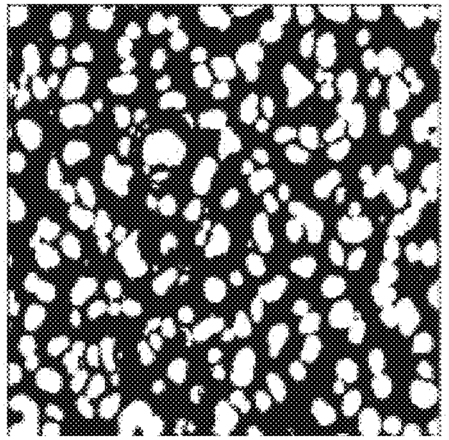

The obtained AFM measured image is binarized using software manufactured by BRUKER. FIG. 8B illustrates the binarized data.

The AFM data consists of a collection of three-dimensional data. This data is plotted while taking the depth direction as a vertical axis and the number of data at each depth as a horizontal axis, which leads to the following example.

Figure 9A:
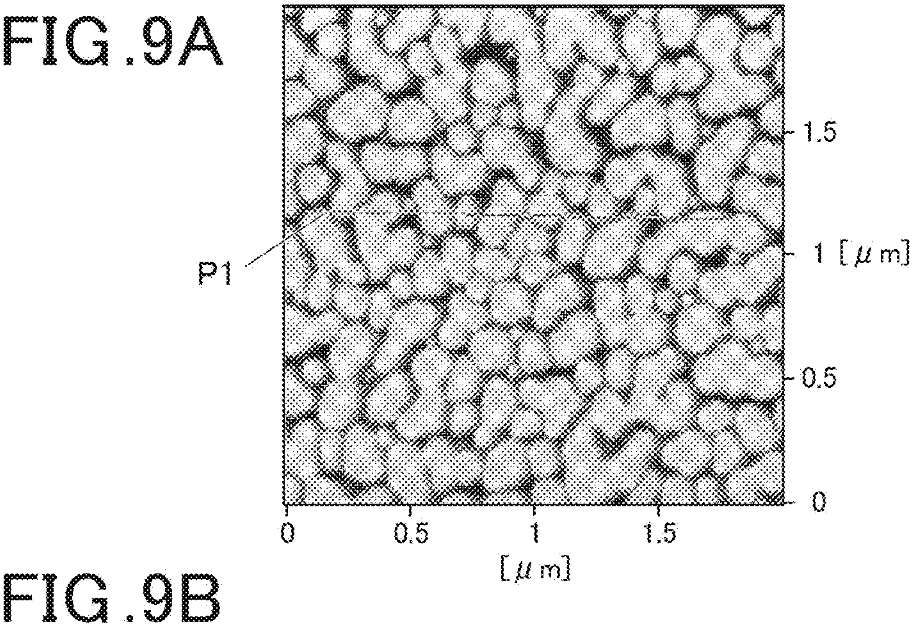
FIGS. 9A, 9B and 9C are diagrams for describing a calculation method of a ratio of a surface area of the uppermost stair of a protruding portion and illustrate an exemplary operation of photographic image analysis by an atomic force microscope.
Figure 9B:
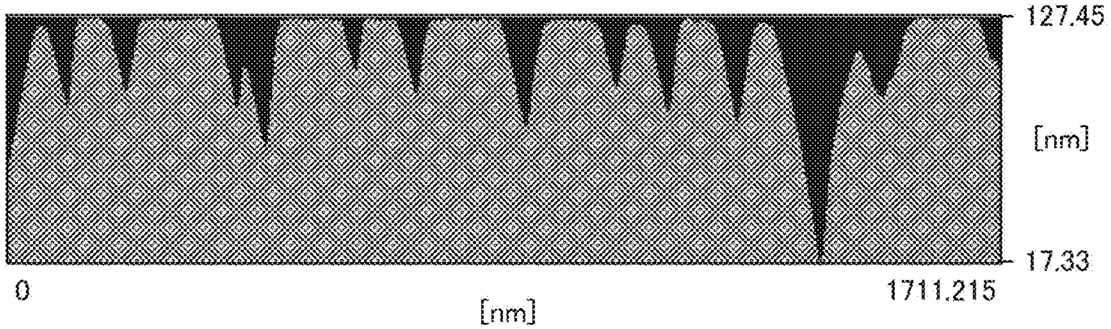
Figure 9C:
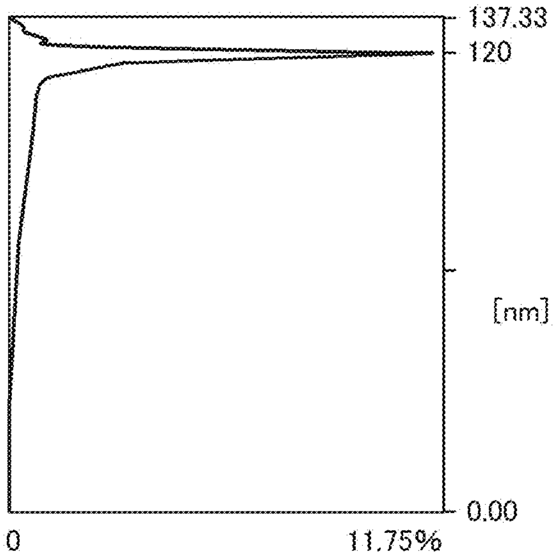

In the case of the one-stair structure, as illustrated in FIG. 9C, its top and bottom surfaces have peaks of the number of data. Meanwhile, in the case of a two-stair structure, as illustrated in FIG. 10C, surfaces of the first and second stairs have peaks.

In order to obtain the area occupied by the protruding portions on the side of the outermost surface, binarization (color editing) is performed using, as a threshold, the midpoint of a peak of the number of data corresponding to the top surface and a peak of the number of data below the peak. In the case of the one-stair structure, the “peak of the number of data below the peak” is a peak corresponding to the bottom surface, and in the case of a two-stair structure, the “peak of the number of data below the peak” is a peak corresponding to the surface of the second stair.

Specifically, FIG. 9A, FIG. 9B, and FIG. 9C correspond to the case of a one-stair shape. FIG. 9B is a cross-sectional profile in the section line P1 illustrated in FIG. 9A. The horizontal axis indicates the scan location, and the vertical axis indicates data in the depth direction. The vertical axis is illustrated as a distance from the deepest point of FIG. 9A when the deepest point is taken as a reference value of zero. FIG. 9C illustrates the numbers of data in the depth direction.

As illustrated in 9C, the height from the bottom surface to the highest top surface is 120 nm, and this position is the highest top surface of the protruding portions of the first stair (uppermost stair). Therefore, binarization (color editing) is performed using the midpoint (60 nm) of the number-of-data-peaks (120 nm) corresponding to the uppermost stair as a threshold. Specifically, a point higher than the midpoint height was displayed as white, and a point lower than the midpoint height was displayed as black.

Figure 10A:
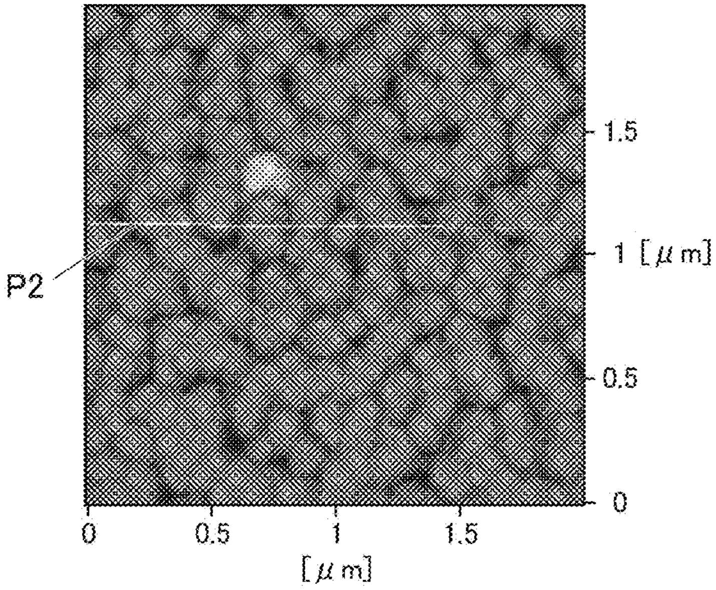
FIGS. 10A, 10B and 10C are diagrams for describing a calculation method of a ratio of a surface area of the uppermost stair of a protruding portion and illustrate an exemplary operation of photographic image analysis by an atomic force microscope.
Figure 10B:
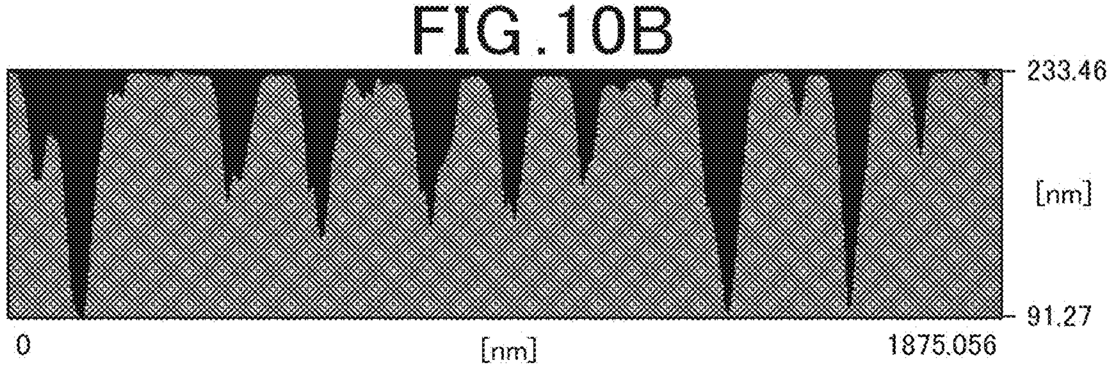
Figure 10C:
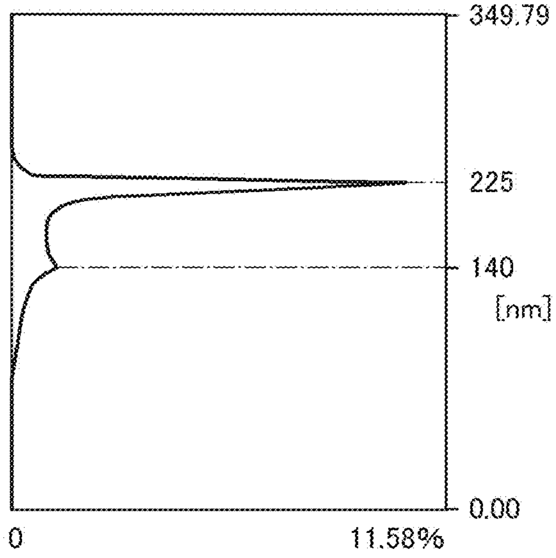

In addition, FIG. 10A, FIG. 10B, and FIG. 10C correspond to the case of a two-stair shape. FIG. 10B is a cross-sectional profile in the section line P2 illustrated in FIG. 10A. The vertical axis and the horizontal axis are as described in FIG. 9B. FIG. 10C illustrates the numbers of data in the depth direction.

As illustrated in FIG. 10C, the peak height of the bottom surface to the highest top surface is 225 nm, and this position is the highest top surface of the protruding portions of the second (uppermost) stair. In addition, at the height of 140 nm from the bottom surface, a peak of data indicating the surface of the protruding portions of the first stair is detected.

Therefore, binarization (color editing) is performed using the midpoint (182.5 nm) between the peak (225 nm) of the number of data corresponding to the surface of the second stair surface and the peak (140 nm) of the number of data corresponding to the surface of the first stair as a threshold. Specifically, a point higher than the midpoint height is displayed as white, and a point lower than the midpoint height is displayed as black.

In addition, in the present invention, the “highest top surface of the protruding portions of the uppermost stair” refers to a surface having a height having the largest number of data (frequency) on the side of the top surface in the histogram as illustrated in FIG. 9C created based on the data obtained by AFM measurement (see FIG. 9C and FIG. 10C).

The “lowest bottom surface of the protruding portions of the lowermost stair” refers to a surface which is included in the same plane that includes a surface having a depth having the largest number of data in the histogram, of the bottom surfaces of concave portions (see FIG. 9C and FIG. 10C).

The “bottom surface of the protruding portions of the uppermost stair” refers to a surface that is included in the same plane that includes the lowest bottom surface of the concave portion adjacent to the protruding portion of the uppermost stair. In other words, it refers to a surface which is included in the same plane that includes a surface having a depth having the largest number of data in the histogram, of the bottom surfaces of the adjacent concave portions (see FIG. 10C).

Then, the image thus created is measured in the same manner by using the free software ImageJ which is the image analysis software described above to measure the ratio of surface area of the protruding portion of the uppermost stair.

A specific measurement method is illustrated below.

Although binarization has already been completed in accordance with the above-described method, it is preferable to perform binarization processing also by the image processing software for the sake of convenience. Conversion to 8 bits is performed by the default setting, and binarization is carried out using Threshold=128 as a threshold (see FIG. 11A, FIG. 11B, and FIG. 11C).

Figure 12A:
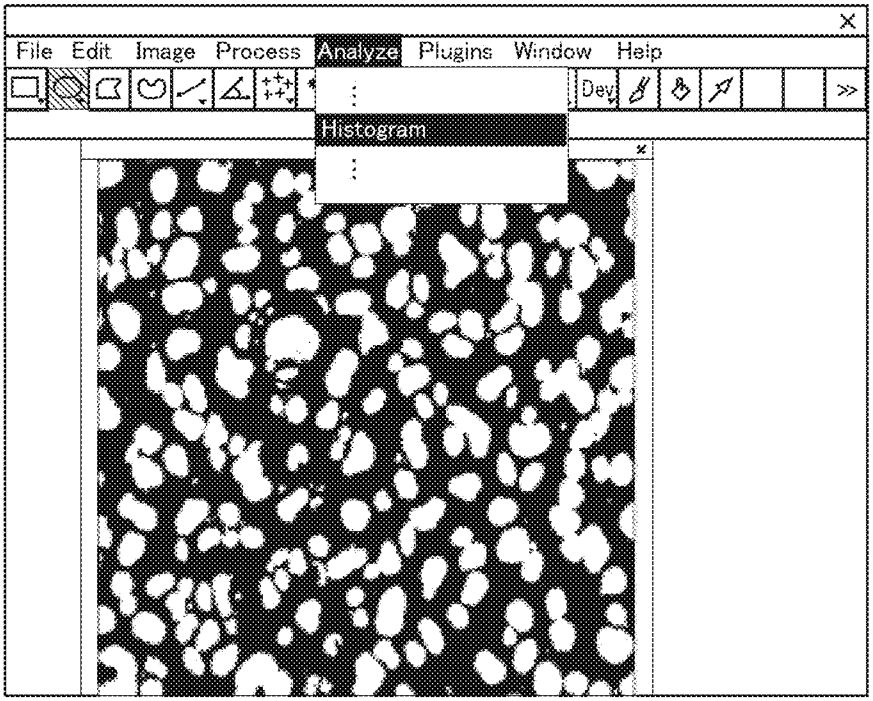
FIGS. 12A and 12B are diagrams for describing a calculation method of a ratio of a surface area of the uppermost stair of a protruding portion and illustrate an exemplary operation of photographic image analysis by an atomic force microscope.
Figure 12B:
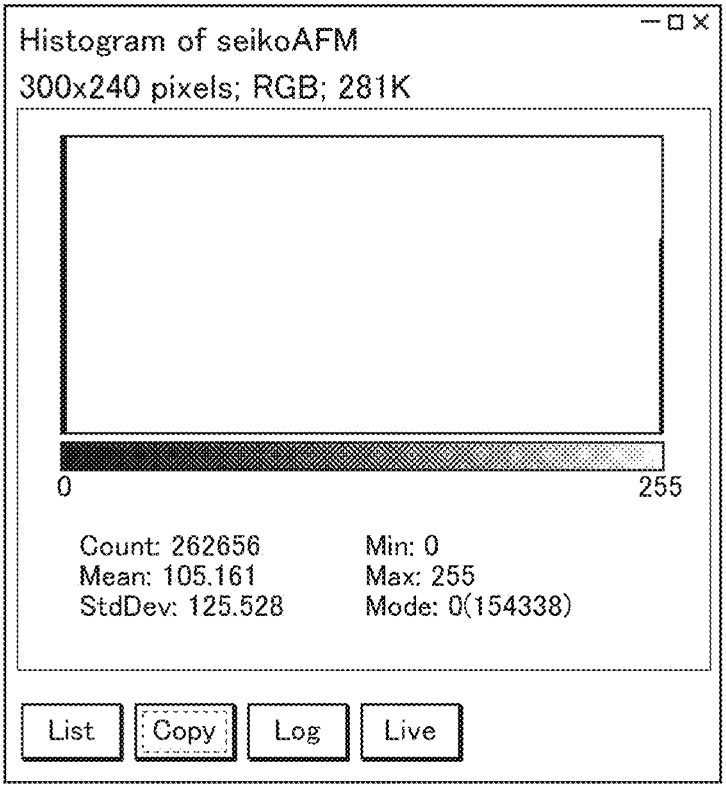

Subsequently, the histogram of the binarized image of an AFM is created (see FIG. 12A and FIG. 12B) The number of black and white data is counted, and the ratio of the number of data of the outermost structure (white) is determined. In this case, the ratio of the area of the surface was 41%.

<Total Average Height and Average Height of Protruding Portion of Uppermost Stair>

The total average height H and the average height h of the protruding portion of the uppermost stair are calculated by measuring the image of the fine uneven structure using an AFM and using software manufactured by BRUKER.

Specifically, an arbitrary cross section of 1 μm or more is analyzed, and a distance between a surface having a height having the largest number of data (frequency) on the side of the top surface and a surface having a depth having the largest number of data is calculated. This distance is analyzed in each of 10 arbitrary cross sections, and the average value thereof is defined as the total average height H.

The average height h of the protruding portion of the uppermost stair is determined by the difference between a peak of the number of data corresponding to the top surface and a peak of the number of data below the peak. In this case as well, the difference is calculated in each of 10 arbitrary cross sections, and the average value thereof is defined as the average height h.

In the case of the one-stair structure, the “peak of the number of data below the peak” is a peak corresponding to the bottom surface, and in the case of a two-stair structure, the “peak of the number of data below the peak” is a peak corresponding to the surface of the second stair.

<Reflectance Adjustment Layer>

Figure 13:
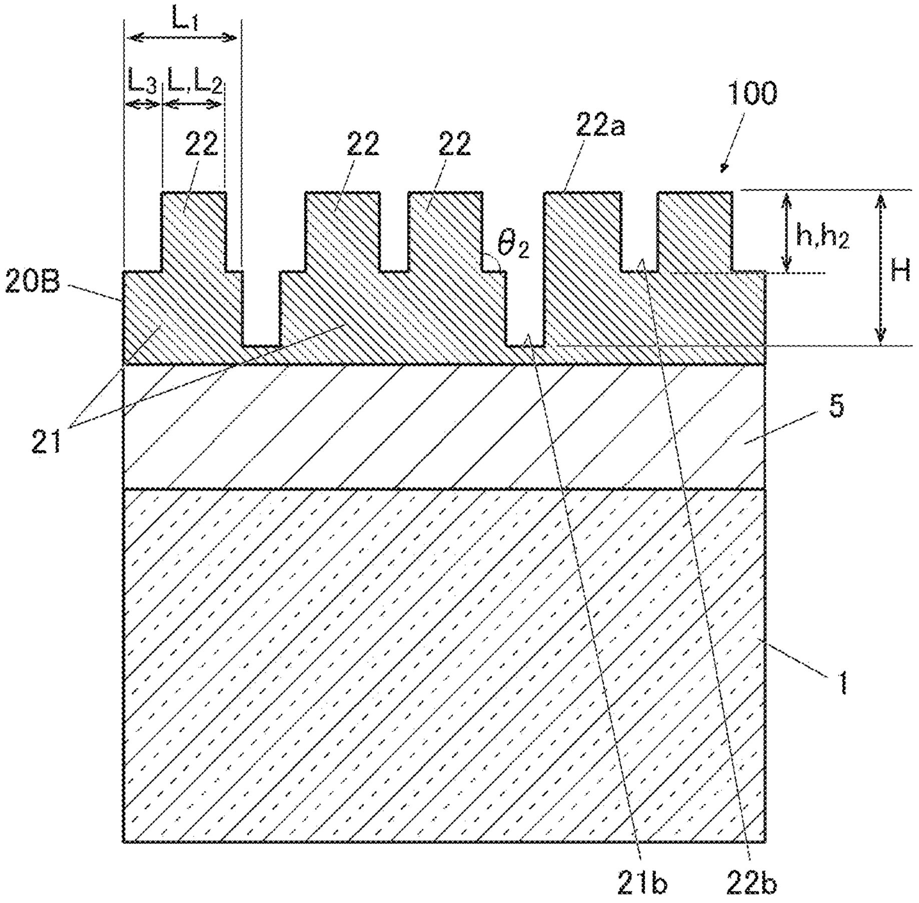
FIG. 13 is a schematic cross-sectional view illustrating an exemplary basic configuration of a functional membrane according to the present invention.

As illustrated in FIG. 13, the functional membrane of the present invention preferably has a reflectance adjustment layer made of a material different from a material of an uneven layer 20 having the fine uneven structure, between a base material 1 and the uneven layer 20.

It is preferable that a refractive index in the functional membrane is increased in the order of the uneven layer 20, the reflectance adjustment layer 5, and the base material 1.

Specifically, it is preferable that the refractive index of the uneven layers is 1.2 to 8, the refractive index of the reflectance adjustment layer is 1.3 to 3.5, and the refractive index of the base material is 1.45 to 5.0. In order to be realize the refractive indexes in the ranges, it is necessary to control the material of each layer.

The material of the reflectance adjustment layer having the refractive index of 1.3 to 3.5 may include $Al_2O_3$, ZnS, SIC and the like.

<Sliding Film>

It is preferable that the functional membrane includes a sliding film in the protruding portion By providing the sliding film, it is effective in prevention of fogging, good adhesion is realized, both rub resistance and super water repellency can be achieved, and it is applicable to optical devices. As the sliding film to be selected, it is preferable for the sliding film to have a physical property that its contact angle is in the range of 40 to 120 degrees, when the sliding film of 100 nm is formed in a single film form on a white flat glass the base material manufactured by SCHOTT Co., Ltd. and is left at room temperature for three days. In particular, it is more preferable for the sliding film to have a contact angle whose difference from a contact angle of the main component constituting the microstructure is 20 degrees or more.

Examples of the sliding film include $Ta_2O_5$—$TiO_2$ (trade name: OA-600 manufactured by Canon Optolon Co., Ltd.), $Ta_2O_5$, $TiO_2$, SiC, $Al_2O_3$, $HfO_2$, and the like.

Examples of a film forming method of the sliding film include an ion-assisted deposition (IAD) method, a sputtering method, and a CVD method in addition to a conventional vacuum deposition method. The thickness of the sliding film is preferably in the range of 0.1 to 20 nm.

<Water-Repellent Film>

The functional membrane preferably has a water-repellent film that contains a water-repellent material on the outermost surface and has a contact angle to water of 110 degrees or more under a condition of 23° C. and 50% RH.

In other words, it is preferable to provide the protruding portion with a film (hereinafter, also referred to as "water-repellent film") that contains a water-repellent material from the viewpoint of improving water-repellency.

The contact angle is measured as follows. For example, 10 μL of pure water is added dropwise to a water-repellent film under an environment of 23° C. and 50% RH using a contact angle measuring device G-1 manufactured by Elma. Then, a static contact angle after 5 seconds of dropping is measured, and this is referred to as a contact angle.

Examples of the water-repellent material include fluorine-based and silicon-based water-repellent materials. Specific examples thereof include fluorosurf (manufactured by Fluorotechnology Co., Ltd.), optool UD120 (manufactured by Daikin Industries, Ltd.), SC100 (manufactured by Canon Optolon Co., Ltd.), and the like. Examples of a film forming method of the water-repellent film include a spin-coating method, a dip-coating method, and a vacuum deposition method.

[Manufacturing Method of a Functional Membrane]

A manufacturing method of a functional membrane according to the present invention is a manufacturing method of a functional membrane which contains an inorganic material and has a fine uneven structure on a surface thereof, including: a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 1 μm or less.

$$10 \leqq X \times Y \quad \text{Formula (I)}$$

It is preferable that the manufacturing method of a functional membrane according to the present invention includes a step of forming a reflectance adjustment layer between a base material and the uneven layer. The reflectance adjustment layer is made of a material different from a material of the uneven layer.

Further, the manufacturing method of a functional membrane according to the present invention preferably includes a step of disposing (applying) a compound that reacts with a metal, which is a main component of the mask, on the inorganic layer before forming the mask and after forming an inorganic material layer. Hereinafter, this step is also referred to as a self-assembly promoting compound disposing step. Accordingly, the compound reacting with the metal chemically reacts with the metal in the mask. As a result, the metal in the mask moves, and the mask is formed in a mesh shape by self-assembly without being heated or the like. Therefore, it is possible to use resin or the like which cannot be heated at high temperature as a material of the base material, thereby reducing the cost. In addition, since no heating is required, the time is shortened, which also leads to reducing the cost and energy saving.

In the self-assembly promoting compound disposing step, a compound that reacts with the metal may be disposed on the mask after forming the mask, instead of before forming the mask. In this case as well, the compound reacting with the metal reacts with the metal in the mask, and the metal in the mask moves to form the mask in a mesh shape. As a result, the same effect as in the case where the self-assembling promoting compound disposing step is performed before forming the mask can be obtained.

Hereinafter, the reflectance adjustment layer forming step, the inorganic layer forming step, the self-assembling promoting compound disposing step, the mask forming step, and the etching step will be described. In the following description, a case where a self-assembly promoting compound disposing step is performed before the mask forming step is described as an example.

Each of FIG. 14A, FIG. 14B, FIG. 14C, FIG. 14D, FIG. 14E, FIG. 14F and FIG. 14G is a process diagram illustrating an example of a manufacturing method of the functional membrane. In the following explanation, a manufacturing method of a functional membrane having a fine uneven structure made of a two-stair the protruding portion will be described, but the present invention is not limited to the manufacturing method described below.

(1) Reflectance Adjustment Layer Forming Step

Figures 14A, 14B, 14C, 14D, 14E, 14F, 14G:
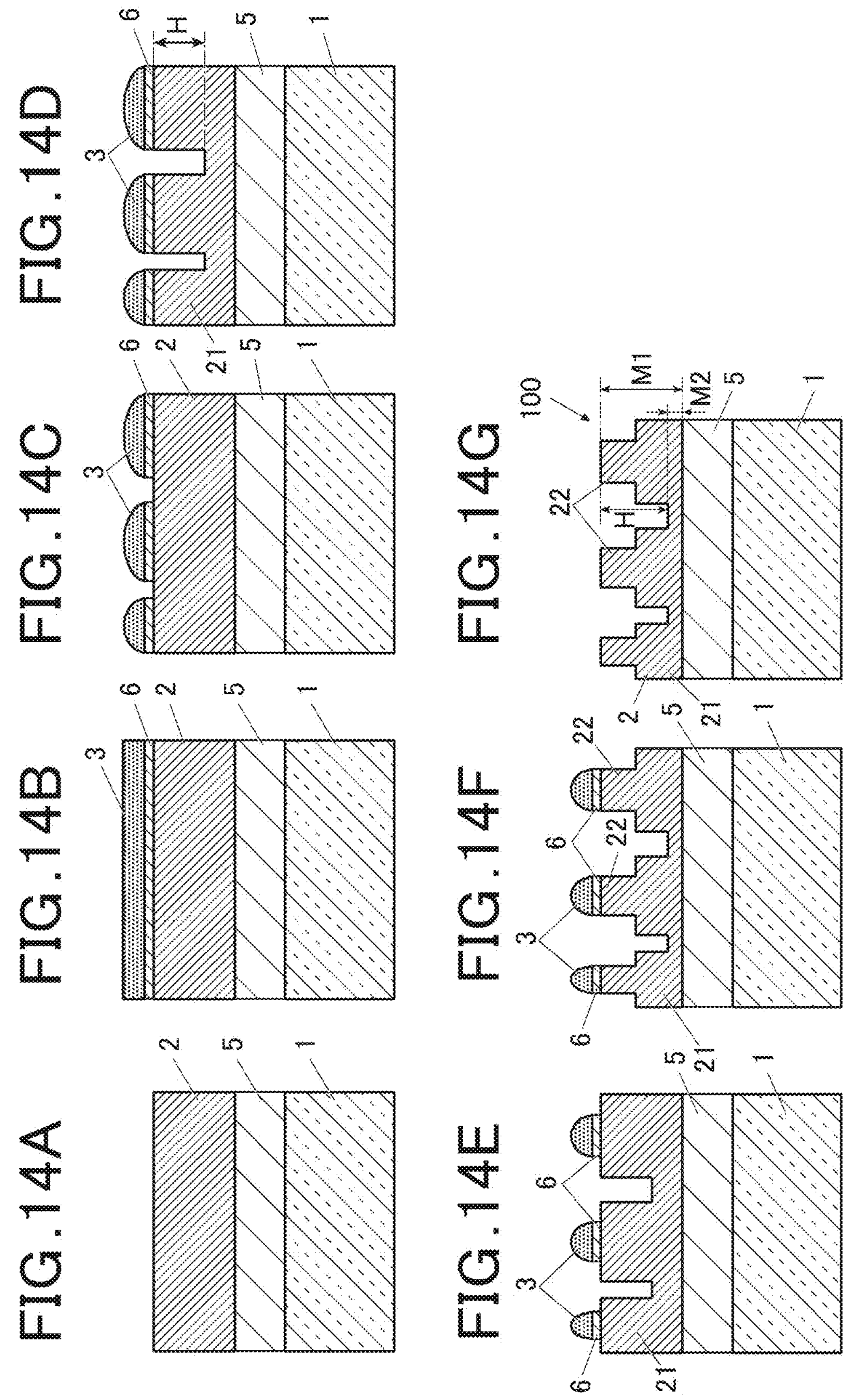
FIGS. 14A through 14G are process diagrams illustrating an exemplary manufacturing method of a functional membrane according to the present invention.

As illustrated in FIG. 14A, a reflectance adjustment layer 5 is formed on the base material 1 by, for example, a dry film forming method.

Examples of the dry film forming method include a vacuum deposition method, an ion beam deposition method, an ion plating method, and the like, and in a sputtering system, a sputtering method, an ion beam sputtering method, a magnetron sputtering method, and the like. In particular, the present invention preferably uses an ion-assisted deposition method (IAD method) or a sputtering method.

The reflectance adjustment layer is preferably made of a material different from a material of an uneven layer (inorganic material layer), and in particular, the material of the reflectance adjustment layer is preferably selected so that in the order of the uneven layer, the reflectance adjustment layer, and the base material, a refractive index in each layer is increased.

A thickness of the reflectance adjustment layer is preferably in the range of 1 to 200 nm.

(Base Material)

The base material (substrate) is not particularly limited, and is preferably made of, for example, an inorganic material, an organic material, or a combination thereof.

Examples of the inorganic material include glass, fused quartz glass, synthetic quartz glass, silicon, and chalcogenide. Examples of the organic material include PET (polyethylene terephthalate), acrylic resin, vinyl chloride resin, cycloolefin polymer (COP), cycloolefin copolymer (COC), polymethyl methacrylate resin (PMMA), polycarbonate resin (PC), polypropylene (PP), and polyethylene (PE). UV-curable resins include radical polymerization type acrylate resins, urethane acrylate, polyester acrylate, polybutadiene acrylate, epoxy acrylate, silicon acrylate, amino resin acrylate, eno-thiol resin, cationic polymerization type vinyl ether resins, fatty cyclic epoxy resins, glycidyl ether vinyl ether, polyester vinyl ether and the like, and thermosetting resins include epoxy resins, phenolic resins, unsaturated polyester resins, urea resins, melamin resins, silicon resins, polyurethane and the like. The base material may be formed by forming a film made of an organic material on an inorganic material such as glass.

In the present invention, as will be described later, when the functional membrane of the present invention is used for an optical device, it is preferable to use glasses or resins from the viewpoint of transparency as a base material. When the functional membrane of the present invention is used for inkjet head, silicon is preferably used as a base material. For infrared lenses, silicon, germanium, or chalcogenide is preferably used as the base material. Further, when the functional membrane is used in a mold, it is preferable to use SiC or cemented carbide as the base material.

(2) Inorganic Layer Forming Step

As illustrated in FIG. 14A, an inorganic material layer 2 including an inorganic material as a main component is formed on the reflectance adjustment layer 5 by, for example, a dry film forming method. When the reflectance adjustment layer 5 is not provided, the inorganic material layer 2 are formed on the base material 1, although not illustrated.

Examples of the dry film forming method include a vacuum deposition method, an ion beam deposition method, an ion plating method, and the like, and in a sputtering system, a sputtering method, an ion beam sputtering method, a magnetron sputtering method, and the like. In particular, the present invention preferably uses an ion-assisted deposition method (IAD method) or a sputtering method.

A thickness of the inorganic material layer varies depending on the type of the inorganic material, and is preferably in the range of 100 to 400 nm when the inorganic material is $SiO_2$. When the inorganic material is SiC, the thickness is preferably in the range of 100 to 1000 nm. When the inorganic material is SiOC, the thickness is preferably in a range of 100 to 500 nm, and when the inorganic material is SiCN, the thickness is preferably in a range of 100 to 500 nm.

(3) Self-Assembly Promoting Compound Disposition Step

Next, as illustrated in FIG. 14B, a compound (also referred to as a "self-assembly promoting compound") 6 that reacts with a metal as a main component of the mask is preferably disposed (applied) on the inorganic layer 2 after the inorganic layer forming step and before the mask forming step.

In FIG. 14B, the self-assembling promoting compound 6 is described as a film, but the compound 6 may be simply scattered in a form of particulates, or may be formed in a form of intermittent layers.

The self-assembling promoting compound is disposed, and in the subsequent mask forming step, the self-assembling promoting compound is covered with the mask, whereby the mask containing the compound is grasped as a mask in a mesh shape.

This is because the self-assembling promoting compound and the metal in the mask chemically react with each other, so that the metal moves and the mask is formed in a mesh shape. In this way, the mask is formed in a mesh shape without heating the mask at a high temperature. Therefore, the compound reacting with the metal is also referred to as a self-assembly promoting compound.

The self-assembly promoting compound is a compound which reacts with a metal which is a main component of the mask.

The self-assembly promoting compound is a compound that easily migrates the metal, and preferably contains, for example, Na (sodium), $I_2$ (iodine), $Cl_2$ (chlorine), and the like.

In particular, the self-assembling promoting compound preferably has hygroscopicity: As a result, the self-assembling promoting compound is formed using the dry film forming method, and then exposed to an atmosphere containing water, whereby particles in the compound are separated and thus a layer having a mesh form or isolated particles (dots) is obtained.

The self-assembly promoting compound preferably has a solubility to water at 20° C. of 0.5 g/100 mL or more. When the solubility is in the above range, the mask can be formed in a mesh shape.

Examples of the compound having a solubility of 0.5 g/100 mL or more include LiCl (solubility: 76.9 g/100 mL (20° C.)), NaCl (solubility: 35.9 g/100 mL (20° C.), $MgCl_2 \cdot 6H_2O$ (solubility: 54.3 g/100 mL (20° C.)), KCl (solubility: 34.0 g/100 mL (20° C.), $CaCl_2$ (solubility: 74.5 g/100 mL (20° C.)), $Na_2CO_3$ (solubility: 22 g/100 mL (20° C.), NaF (solubility: 4.06 g/100 mL (20° C.)), and KI (solubility: 148 g/100 mL (20° C.).

The self-assembly promoting compound is preferably an inorganic salt, and it is preferable that at least a part of the inorganic salt contains an alkali metal from the viewpoint of improving hydrophilic resistance to high temperature and high humidity.

NaCl, NaF, $MgCl_2 \cdot 6H_2O$ and the like are preferable as inorganic salt which satisfies the range of the solubility and is an alkali metal. The self-assembling promoting compound preferably contains Na.

The average particle size of the particles constituting the self-assembling promoting compound is preferably in the range of 10 to 1000 nm. The average particle size of the particles can be measured by an electron-microscopy (S-4800 Hitachi High-Tech, Inc.).

The self-assembling promoting compound is applied on the inorganic material layer by, for example, a dry film forming method.

Examples of the dry film forming method include, as a deposition type of method, a vacuum vapor deposition method, an ion beam vapor deposition method, an ion plating method, an ion assisted vapor deposition method (hereinafter, also referred to as "IAD method" in the present invention), and the like, and include, as a sputtering type of method, a sputtering method, an ion beam sputtering method, a magnetron sputtering method, and the like. Among them, a vacuum vapor deposition method, the IAD method, or a sputtering method is preferable. In particular, a resistance heating type vacuum deposition method is preferable.

A thickness of the layer made of the self-assembling promoting compound thus formed in such a way is preferably in the range of 0.1 to 100 nm.

In the above description, the self-assembly promoting compound is disposed before the mask forming step, but the present invention is not limited thereto. For example, the self-assembling promoting compound may be disposed on the mask after the mask forming step described later.

(4) Mask Forming Step

Next, as illustrated in FIG. 14B, a mask 3 is formed on the self-assembling promoting compound 6. Further, the mask forming step is performed once.

As the mask, the main component is a metal. Further, for example, it is preferable to use a metal mask composed of a metal portion and an exposed portion.

Examples of the metal as a main component of the mask include silver (Ag), indium, and tin, and silver is particularly preferable.

A thickness of the masking layer is preferably in the range of 2 to 100 nm.

Depending on a film forming condition, for example, forming a film of the metal mask using a deposition method at a rate of 3 Å and at a temperature of the base material of 370° C. so that a thickness of the film becomes 2 nm leads to the metal mask in a shape of particulates. Further, for example, forming a film of the metal mask using a deposition method at a rate of 3 Å and at a temperature of the base material of 170° C. so that a thickness of the film becomes 12-15 nm is likely to lead to the metal mask in a mesh shape. Further, for example, forming a film of the metal mask using a sputtering method at a rate of 3 Å and at a temperature of the base material of 30° C. so that a thickness of the film becomes 10 nm is likely to lead to the metal mask in a porous shape.

In this way, a film forming condition of the metal-mask, a temperature of the base material, a rate of film forming, and a thickness of the film to be formed control the average diameter of the protruding portion formed by etching, the ratio of the surface area, and the average height.

A temperature for forming the film is preferably in the range of 20 to 400° C.

A temperature for forming the film also controls the average diameter L of the protruding portion formed by etching, the ratio of the surface area and the average height h.

Here, as described above, the self-assembling promoting compound is provided adjacent to the upper surface or the lower surface of the mask in advance, so that the self-assembling promoting compound absorbs moisture by exposure to the atmosphere or the like. As a result, the self-assembling promoting compound chemically reacts with the metal in the mask. As a result, the mask is formed in a mesh shape by self-assembly without being heated or the like by moving the metallic material in the mask (see FIG. 14C). Here, when the self-assembly promoting compound is not applied as in the prior art, it is by heating at high temperature that the metal mask is formed in a mesh shape. That is, applying the self-assembly promoting compound eliminates the high-temperature heating. As a result, it is possible to use resin or the like which cannot be heated at high temperature as a material of the base material, thereby reducing the cost. In addition, since no heating is required, the time is shortened, which also leads to energy saving.

(5) Etching Step

Next, the inorganic material layer 2 is etched. The etching step is preferably performed at least once.

In the present invention, the "number of times of the etching step" is counted as one time when an etching target is placed in the etching device, and then the etching is started, and exposure to the atmosphere is performed. Therefore, even when an etching condition is changed during the etching, the etching is counted as one time etching as long as exposure to the atmosphere is not performed In the etching step, it is preferable to perform etching by combining the anisotropic etching condition and the isotropic etching condition.

Specifically, etching under the anisotropic etching condition is performed first, and then etching under the isotropic etching condition is performed. The anisotropic etching and the isotropic etching are preferably repeated a plurality of times.

For example, it is preferable to perform anisotropic etching, then isotropic etching, and then anisotropic etching again. More preferably, a series of anisotropic etching, isotropic etching, and anisotropic etching are performed without exposure to the atmosphere. The etching in this case is one time etching.

Further, after anisotropic etching is performed, the mask is exposed to the atmosphere and stored in a humid atmosphere for one hour to accelerate transfer of the mask, and then anisotropic etching may be performed again. The etching in this case is two times etching.

In particular, when the number of stairs (Y) of the protruding portions is two or more, that is, when the unevenness structure has a shape of two stairs or more, anisotropic etching and isotropic etching are combined. When the number of stairs of the protruding portion (Y) is one, that is, when the uneven structure has a one-stair shape, the uneven structure can be formed by only anisotropic etching.

Here, "isotropic etching" refers to etching in which etching proceeds at a uniform rate in all directions of an object. Meanwhile, "anisotropic etching" refers to etching in which etching proceeds faster in a particular direction of an object. In other words, in anisotropic etching, etching proceeds preferentially only in the particular direction of the object.

Therefore, anisotropic etching is performed by using an etching device from the side of the top surface side through the mask formed above, so that the etching is preferentially performed in the depth direction of the inorganic material layer. As a result, irregularities are formed in the inorganic material layer. In addition, isotropic etching is performed in the same manner in the depth direction of the mask formed above and in the lateral direction of the mask formed above. Thus, the size of the mask can be changed.

(5-1) Anisotropic Etching

In anisotropic etching, the inorganic layers are etched by using an etching device from the side of the tio surface through the mask formed above. Anisotropic etching forms concave portions, which leads to forming protruding portions.

Anisotropic etching preferably includes a first anisotropic etching and a second anisotropic etching.

That is, it is preferable to perform the first anisotropic etching (see FIG. 14D), then perform the isotropic etching (see FIG. 14E), which will be described later, and then perform the second anisotropic etching (see FIG. 14F). Further, it is preferable not to expose it to the atmosphere during the first anisotropic etching, the isotropic etching, and the second anisotropic etching since cost reduction is achieved.

It is preferable that the first anisotropic etching is performed so as not to expose the reflectance adjustment layer. Specifically, the etching time is controlled so that the total average height H is 1 μm or less. As described above, the first anisotropic etching forms concave portions (protruding portions 21) of the first stair.

The second anisotropic etching is performed after the isotropic etching, which will be described later. Since the size of the mask is reduced by the isotropic etching, in the second anisotropic etching, the inorganic material layer are etched from the side of the top surface by using an etching device through the reduced mask. It is preferable that the second anisotropic etching is performed so as not to expose the reflectance adjustment layer in the concave portions of the first stair. Specifically, the etching time is controlled such that the depth of the concave portions of the second stair is 10 nm to 200 nm. As a result, concave portions (protruding portions 22) of the second stair are formed.

It is preferable that the frequency of RF power supply at the time of anisotropic etching be as low as possible in view of cost reduction of a mass production device and advantage in increasing the size, although not necessarily in the range due to the capability of the device.

The frequency in the first anisotropic etching is preferably in the range of 0.5 kHZ to 1 MHZ, and the frequency in the second anisotropic etching preferably in the range of 0.5 kHZ to 1 MHZ.

In the first anisotropic etching, the power density is preferably in the range of 0.01 to 1 W/cm$^2$ in view of increasing selectivity of the metal mask. In the second anisotropic etching, the power density is preferably in the range of 0.01 to 1 W/cm$^2$.

In addition, it is desirable that the base material has a cooling mechanism or a heat dissipation mechanism in view of increasing selectivity of the mask. If there is no cooling mechanism or the like, a standby time for stopping electric power is provided for cooling as appropriate. Alternatively, it may be desirable to shut down completely and expose it to the atmosphere once and dissipate heat, or supply electric power intermittently while turning on and off using a pulsed power supply.

Time of the first anisotropic etching is preferably in the range of 1 minute to 2 hours, and time of the second anisotropic etching is preferably in the range of 1 minute to 2 hours.

In addition, it is preferable that a chamber of the etching device has a temperature of 5 to 30° C. and a starting vacuum of 1 to 20 Pa.

For the first and second anisotropic etching, reactive dry etching using an etching device or a device in which etching gas is introduced into an IAD deposition device is used.

The etching device preferably has a plasma electrode and a configuration capable of cooling the plasma electrode.

Examples of the etching gas to be used, includes $CHF_3$, $CF_4$, $COF_2$ and $SF_6$. As a result, a plurality of concave portions are formed by etching from the inorganic material layer to the vicinity of the upper surface of the reflectance adjustment layer in a predetermined size. Thus, protruding portions are formed. That is, the constituent layer corresponding to the exposed portion of the metal mask is etched.

Flow rate of the etching gas in the first anisotropic etching is preferably in the range of 5 to 100 sccm. Flow rate of the etching gas in the second anisotropic etching is preferably in the range of 5 to 100 sccm.

(5-2) Isotropic Etching

The isotropic etching is performed by using an etching device with respect to the mask formed above. By the isotropic etching, the mask is etched in the depth direction and the lateral direction to change its size (see FIG. 14E).

The isotropic etching is preferably performed while a degree of vacuum or a power density is changed at least once during the isotropic etching.

For example, the isotropic etching is initially performed with a degree of vacuum in the range of 5 to 20 Pa and a power density in the range of 0.01 to 0.5 W/cm$^2$. Here, it is preferable to change, in the middle of the isotropic etching, the degree of vacuum in a range of 1 to 10 Pa and the power density in a range of 0.03 to 1.0 W/cm$^2$ from the middle.

The initial isotropic etching time is preferably in the range of 1 minute to 2 hours, and the modified isotropic etching time is preferably in the range of 1 minute to 1 hour.

In addition, it is preferable that a chamber of the etching device has a temperature of 5 to 30° C. and a starting vacuum of 1 to 20 Pa.

For the isotropic etching, reactive dry etching using an etching device or a device in which etching gas is introduced into an IAD deposition device is used. Examples of the etching gas to be used, includes Ar, $O_2$, $N_2$, $CHF_3$, $CF_4$, $COF_2$ and $SF_6$. As a result, the mask is isotropically etched, and the size of the mask is changed.

Flow rate of the etching gas in the isotropic etching is preferably in the range of 5 to 100 sccm.

The isotropic etching preferably changes the size of the mask so that an average diameter of the mask is in a range of 10 to 200 nm when viewed from a top surface thereof, and an average height is in a range of 5 to 50 nm.

(6) Mask Peeling Step

In a mask peeling step, as illustrated in FIG. 14G, the mask formed on the top surface is removed. Specifically, the metal mask is removed by wet etching using a drug such as nitric acid, acetic acid, iodine, or potassium iodide. Alternatively, the metal-mask may be removed by dry etching using Ar or $O_2$ as etching gas.

By removing the mask, a fine uneven structure having the protruding portions of the first stair and the second stair is formed.

As described above, according to the manufacturing method of a functional membrane of the present invention, the protruding portions of the first stair and the second stair can be formed by a single mask forming step, so that cost reduction can be achieved.

(7) Sliding Film and Water-Repellent Film Forming Step

In a sliding film and water-repellent film forming step, it is preferable to form the sliding film using, for example, a dry film forming device for the protruding portions having a two-stair shape (the protruding portions 21 of the first stair and the protruding portions 22 of the second stair).

Finally, a water-repellent film is preferably formed on the sliding film by using a dry film forming device or a wet film forming device. Note that illustration of the sliding film and the water-repellent film is omitted.

Through the above steps, the functional membrane 100 of the present invention can be obtained.

In the above manufacturing method, the manufacturing method of the functional membrane having the fine uneven structure 20B formed by the protruding portions having a two-stair shape has been described. However, depending on a Mohs hardness of the inorganic material, the functional membrane of the present invention may have a fine uneven structure formed by protruding portions having a one-stair shape. Further, the functional membrane of the present invention may have a fine uneven structure formed by protruding portions having a shape of three stairs or more.

When the functional membrane having a fine uneven structure formed by protruding portions having a three-stair shape, it is preferable that a thickness of a metal mask when the protruding portions of the first stair are formed is in a range of 5 to 100 nm. In addition, it is preferable that the thickness of the metal mask when the protruding portions of the second stair are formed is in a range of 5 to 70 nm. Moreover, it is preferable that the thickness of the metal mask when the protruding portions of the third stair are formed is in a range of 2 to 10 nm.

Also, it is preferable that a film forming temperature of the metal mask when the protruding portions of the first stair are formed is in a range of 150 to 400° C. In addition, it is preferable that the film forming temperature of the metal mask when the protruding portions of the second stair are formed is in a range of 100 to 400° C. Moreover, it is preferable that the film forming temperature of the metal mask when the protruding portions of the third stair are formed is in a range of 100 to 400° C.

[Application Fields of Functional Membrane]

<Optical Device>

The functional membrane of the present invention has both rub resistance and super water repellency, and an optical device according to the present invention includes the functional membrane of the present invention. Furthermore, it is preferable that the optical device is a lens, a cover glass of a lens, an antimicrobial cover member, an antifungal coating member or a mirror. Such an optical device is applied to, for example, an in-vehicle lens or a communication lens, an optical member such as an infrared sensor or a LiDAR window, an optical window or a lens of a surveillance camera, a drone or the like, an antibacterial lens for an endoscope, a member of a PC or a smartphone or an antibacterial cover member, an eyeglass, a pottery of a toilet or tableware, a mold-proof coating of a bath or a sink, or a building material (window glass) is suitably used. In particular, the functional membrane of the present invention is suitable as an in-vehicle lens.

In addition, in the optical device to which the functional membrane of the present invention is applied, it is preferable that the base material is glass or resin from the viewpoint of transparency. The inorganic material of the main component contained in the functional membrane is preferably $SiO_2$, Si, or SiC which is a material containing Si from the viewpoint of easily forming a reaction product by fluorine-gas and being thus easily etched.

<Inkjet Head>

The functional membrane of the present invention is also applicable to an inkjet head. That is, an inkjet head according to the present invention includes the functional membrane.

In addition, in the inkjet head to which the functional membrane of the present invention is applied, it is preferable that the base material is silicon from the viewpoint of durability and processing properties. The inorganic material of the main component contained in the functional membrane is preferably SiC from the viewpoint of ink-wiping property.

<Mold>

The functional membrane of the present invention can also be applied to a mold. That is, the mold of the present invention includes the functional membrane.

In the mold to which the functional membrane of the present invention is applied, the base material is preferably SiC or cemented carbide from the viewpoint of strength, and the inorganic material of the main component contained in the functional membrane is preferably SiC which is a material containing Si from the viewpoint of easily forming a reaction product by fluorine-gas and being thus easily etched, and being hard.

EXAMPLES

Hereinafter, the present invention will be described in detail with reference to Example, but the present invention is not limited thereto. In Example below, unless otherwise specified, the process was performed at room temperature (25° C.). Unless otherwise specified, "%" and "part" mean "% by mass" and "part by mass", respectively.

[Manufacture of Functional Membrane 1]

<Preparing for Base Material>

As the base material, a glass substrate, TAFD5G (manufactured by HOYA) (refractive index: 1.84) was prepared.

Base materials illustrated in the table below are as follows.

TAFD5G (Glass substrate, manufactured by HOYA)

White plate (white flat glass substrate, manufactured by Piezo Parts Co., Ltd.)

Si (Silicone substrate, manufactured by Furuuchi Chemical Co., Ltd.)

SiC (Silicon carbide substrate, manufactured by Aszac Corporation)

PC (polycarbonate substrate, commercially available)

<Film Forming for Reflectance Adjustment Layer>

The base material was placed in an IAD vacuum deposition device, and $Al_2O_3$ was loaded as a film material. A film was deposited at a rate of 3 Å/sec to form a reflectance adjustment layer having a 72 nm thickness on the base material.

An IAD condition is an accelerating voltage of 1000 V, an accelerating current of 1000 mA, a suppressor voltage of 500 V, and a neutralizing current of 1500 mA, and neutral gas of Ar of 10 sccm.

(Chamber Conditions)

Heating temperature: 370° C.

Starting degree of vacuum: $3.0\times10^{-3}$ Pa (Vapor Source of Film Forming Material)

Electron gun (IAD Ion Source)

RF ion source NIS-175-3 of Synchron

Film forming material: $Al_2O_3$(Canon Optron Inc. trade name: $Al_2O_3$)

A refractive index of the reflectance adjustment layer formed by the film was illustrated in the following table below.

<Forming Film of Inorganic Layer 1>

A sample in which the reflectance adjustment layer was formed set in an IAD vacuum deposition device. $SiO_2$ was loaded as a film forming material and deposited at a film forming rate of 1 Å/sec, whereby an inorganic layer ($SiO_2$ layer) whose thickness is 293 nm was formed.

The IAD condition was an accelerating voltage of 1000 V, an accelerating current of 1000 mA, a suppressor voltage of 500 V, a neutralizing current of 1500 mA, and neutral gas of Ar of 10 sccm conditions.

(Chamber Conditions)

Heating temperature: 370° C.

Starting vacuum: $3.0\times10^{-3}$ Pa (Vapor Source of Film Material)

Electron gun (IAD Ion Source)

RF ion source NIS-175-3 of Synchron

Film forming material of inorganic layer: $SiO_2$ (Canon Optron Co., Ltd. trade name: $SiO_2$)

<Film Forming of Ag Mask>

A film of an Ag mask was formed on the inorganic layer formed by a film. In the film forming of the Ag mask, a synthetic film forming device (BMC-800T, manufactured by Synchron Co., Ltd.) was used under the following condition to form the Ag mask. The thickness of Ag mask was 25 nm.

Heating temperature: 210° C.

Starting vacuum: $1.33\times10^{-3}$ Pa

Film forming rate: 3 Å/sec

<First Anisotropic Etching>

The sample, in which the Ag mask was formed, was placed on a plasma-electrode through which a coolant at 20° C. of the etching device, and the first anisotropic etching was performed. The etching was performed at an etching rate of 2 nm/min to form an uneven shape of the first stair. Protruding portions of the first stair has a total average height H of 265 nm.

The etching condition was an input power of 300 W, a gas flow rate of 20 sccm, and a degree of vacuum of 10 Pa.

(Chamber Condition)

Device: BIG CUBE of Eupatteter Co., Ltd.

Temperature: 20° C.

Starting degree of vacuum: 10.0 Pa (Etching Gas)

$CHF_3$ (Etching Gas Flow Rate)

20 sccm (Power Density)

0.035 W/cm$^2$

<Isotropic Etching>

After forming the uneven shape of the first stair, the isotropic etching was subsequently performed to resize the Ag mask.

The etching condition was etching for ten minutes under an input power of 600 W, a gas flow rate of 20 sccm, and a degree of vacuum of 10 Pa, and another etching for ten minutes in which only degree of vacuum was changed to 2.5 Pa. This was repeated twice.

(Chamber Condition)

Device: BIG CUBE of Eupatteter Co., Ltd.

Temperature: 20° C.

Starting degree of vacuum: 10.0 Pa (Etching Gas)

$CHF_3$ (Etching Gas Flow Rate)

20 sccm (Power Density)

0.077 W/cm$^2$

<Second Anisotropic Etching>

After the mask was resized by the isotropic etching, the second anisotropic etching was subsequently performed. Etching was performed at an etching rate 2 nm/min to form an uneven shape of a second stair. Protruding portions of the second stair has an average height h of 100 nm.

The etching condition was an input power of 300 W, a gas flow rate of 20 sccm, and a degree of vacuum of 10 Pa.

(Chamber Condition)

Device: BIG CUBE of Eupatteter Co., Ltd.

Temperature: 20° C.

Starting degree of vacuum: 10.0 Pa (Etching Gas)

$CHF_3$ (Etching Gas Flow Rate)

20 sccm (Power Density)

0.035 W/cm$^2$

A series of processes of the first anisotropic etching, the isotropic etching, and the second anisotropic etching was performed without exposure to the atmosphere. The number of times of the etching of the present embodiment was one since exposure to the atmosphere was not involved during the series of processes of the first anisotropic etching, the isotropic etching, and the second anisotropic etching.

The time of the anisotropic etching (total time of the first anisotropic etching and the second anisotropic etching) and the time of the isotropic etching are illustrated in the table below.

<Peeling of Ag Mask>

After the second anisotropic etching step, the sample was immersed in Pure Etch Au100 (Hayashi Pure Chemical Ind., Ltd.) for five seconds and the Ag mask was peeled off. After that, it was washed with pure water and cleaned for 600 seconds using a UV ozonizer (TechnoVision Co., Ltd.).

A refractive index of the uneven layers after the mask peeling was illustrated in the table below.

<Forming a Sliding Film>

After peeling the Ag mask, a sliding film was formed as follows.

By using Gener-1300 (Optoron) vacuum deposition device, the above-mentioned film forming material was loaded and deposited at a film forming rate of 4 Å/sec, whereby a sliding film whose thickness is 2 nm was formed.

Temperature of base material: 25° C.

Starting degree of vacuum: $3.0\times10^{-3}$ Pa (Vapor Source of Film Forming Material)

Electron gun

<Forming Water-Repellent Film>

Following the sliding film, a water-repellent film was subsequently formed in the same device as described below.

Film forming was performed using an Optool UD120 (Daikin Industries, Ltd.) using the following vacuum deposition device. By using Gener-1300 (Optoron) vacuum deposition device, the above-mentioned film forming material was loaded and deposited at a film forming rate of 1 Å/sec, whereby a water-repellent film whose thickness is 20 nm was formed.

Temperature of base material: 25° C.

Starting degree of vacuum: $3.0\times10^{-3}$ Pa (Vapor Source of Film Forming Material)

Resistance heating

The functional membrane 1 was obtained as described above.

[Production of Functional Membrane 2]

The functional membrane 2 was produced in the same manner as the production of the functional membrane 1 except that the type of the base material was changed as illustrated in the table below and the reflectance adjustment layer was not provided.

[Production of Functional Membrane 3]

In the production of the functional membrane 1, a step of disposing a self-assembling promoting compound illustrated below was performed after forming the inorganic material layer and before forming the film of the Ag mask. Thereafter, the functional membrane 3 was produced in the same manner as the production of the functional membrane 1 except that the film of the Ag mask was formed under the following condition.

<Self-Organizing Promoting Compound Arrangement Step>

The above the base material was placed in a vacuum deposition device, and NaCl as a film forming material was loaded and deposited at a film rate of 0.5 Å/sec, whereby a self-assembling promoting compound whose thickness is 5 nm was disposed. The solubility of NaCl in water [g/mL] (20° C.) is illustrated in the table below.

(Chamber Conditions)

Heating temperature: 90° C.

Starting degree of vacuum: $3.0\times10^{-3}$ Pa (Vapor Source of Film Forming Material)

Resistance heating

Film forming material: NaCl (trade name Sodium Chloride manufactured by Hayashi Pure Chemical Industries, Ltd.)

<Film Forming of Ag Mask>

A base material to which the self-assembly promoting compound was applied was placed in a vacuum deposition device (manufactured by BES1300-DN Synchron Co., Ltd.), and Ag as a film forming material was loaded, and deposited at a film forming rate of 1.0 Å/sec. Thus, a mask layer whose thickness is 25 nm was formed on the self-assembly promoting compound.

Thereafter, the Ag layer was deformed into a structure of a network-like form (a mesh form) by returning the vacuum to the atmosphere once and chemically causing Ag to react with NaCl.

(Chamber Conditions)

Heating temperature: 90° C.

Starting degree of vacuum: $3.0\times10^{-3}$ Pa (Vapor Source of Film Forming Material)

Resistance heating

Film forming material: Ag (trade name Ag of Nippon Materials Co., Ltd.)

[Production of Functional Membrane 4]

The functional membrane 4 was produced in the same manner as in the functional membrane 2, except that a self-assembling promoting compound was placed in the same manner as in the production of the functional membrane 3 and then the film of the Ag mask was formed film, after forming the inorganic material layer and before forming the film of the Ag mask

[Production of Functional Membrane 5]

The functional membrane 5 was produced in the same manner as in the functional membrane 2 except that the number of times of etching was twice.

Here, "the number of times of etching was twice" means that the process of the first anisotropic etching, the isotropic etching, and the second anisotropic etching was performed, and then exposure to the atmosphere was carried out once. Storing for 1 hour in a humid environment promoted the transfer of metals. Then, the first anisotropic etching, the isotropic etching, and the second anisotropic etching were performed again.

[Production of Functional Membrane 6]

The functional membrane 6 was prepared in the same manner as in the preparation of the base material 1 except that the type of the base material was changed as illustrated in the table below and the film of the reflectance adjustment layer was formed as follows.

<Film Forming of Reflectance Adjustment Layer>

The base material was placed in an IAD vacuum deposition device, and ZnS as a film forming material was loaded, and deposited at a film forming rate of 3 Å/sec to form, on the base material, a reflectance adjustment layer whose thickness was 200 nm.

(Chamber Conditions)

Heating temperature: 25° C.

Starting degree of vacuum: $3.0\times10^{-3}$ Pa (Vapor Source of Film Forming Material)

Electron gun (IAD Ion Source)

RF ion source NIS-175-3 of Synchron

Film forming material: ZnS (trade name ZnS of MERCK)

A refractive index of the reflectance adjustment layer formed by a film was as illustrated in the table below.

[Production of Functional Membrane 7]

In the preparation of the functional membrane 2, the type of the base material was changed as illustrated in the table below, and the film of the inorganic material layer was formed as follows. Further, the functional membrane 7 was manufactured in the same manner except that only the first anisotropic etching was performed, and the isotropic etching and the second anisotropic etching were not performed.

The uneven layer formed as described above has a one-stair shape.

<Film Forming of Inorganic Layer 2>

The base material was installed in a CVD device (PE-CVD device, manufactured by YOUTEC). The film of the inorganic material layer (SiC layer) was formed for 130 seconds under the chamber conditions described below while tetramethylsilane of 50 sccm was supplied. The film has a thickness of 250 nm.

(Chamber Conditions)

Upper electrode: 100° C., 0 W

Lower electrode: 100° C., 500 W

Degree of starting vacuum: 15 Pa (Film Forming Material)

Tetramethylsilane (manufactured by Yamanaka Hutech Co., Ltd.) of 50 sccm

[Production of Functional Membrane 8]

The functional membrane 8 was prepared in the same manner as in the preparation of the functional membrane 4 except that the type of the base material was changed as illustrated in the table below and the self-assembling compound disposition step was changed as follows.

<Self-Assembling Compound Disposition Step>

The above base material was placed in a vacuum deposition device, and NaF as a film forming material was loaded, and deposited at a film forming rate of 0.5 Å/sec to dispose a self-assembling promoting compound whose thickness was 5 nm. The solubility [g/mL] of NaF in water (20° C.) was illustrated in the table below.

(Chamber Conditions)

Heating temperature: 90° C.

Starting degree of vacuum: $3.0\times10^{-3}$ Pa (Vapor Source of Film Forming Material)

Resistance heating

Film forming material: NaF (trade name NaF, manufactured by Sanwa Polishing Industry Co., Ltd.)

[Production of Functional Membrane 9]
(Comparative Example)

The functional membrane 9 was produced in the same manner as in the production of the functional membrane 2 except that heating temperature at the time of the film forming was 370° C., and the isotropic etching and second anisotropic etching were not performed.

For each of the functional membranes obtained above, a total average height H was calculated by the following method and is illustrated in the table below.

A Mohs hardness of the inorganic substance contained in each of the inorganic substance layers is also illustrated in the table below.

Further, with respect to each of the obtained functional membranes, the entire fine uneven structure was photographed from the top surface by an electron-microscope, and the presence or absence of a mesh shape was observed when the photograph was observed. The observation result is illustrated in the following table.

<Total Average Height>

The total average height H was calculated by an image analysis method using an atomic force microscope (Atomic Force Microscope AFM) as described above. As described above, the cross section of the protruding portion may be calculated by observing the cross section with an electronic microscope.

[Evaluation]

Each of the functional membranes obtained above was evaluated as follows.

<Initial Water Contact Angle>

Using a contact angle measuring device, G-1 manufactured by Elma Co., Ltd., a static contact angle was measured after 5 seconds since dropping of pure water of 10 μL on the functional membrane (water-repellent film on the outermost surface) under an environment of 23° C. and 50% RH was started, and the measured static contact angle was defined as an initial water contact angle. A water contact angle of 1100 or more was considered to be practically satisfactory.

<Water Contact Angle after Rubbing>

Using Bencot Clean Wipe P (manufactured by Asahi Kasei Co., Ltd.), 2000 times of rubbing by a load of 250 g/cm$^2$ was performed on the functional membrane. The rubbing process was performed on the functional membrane by manual rubbing while measuring the weight of the functional membrane by a general electronic balance. Then, using the contact angle measuring device, G-1 manufactured by Elma Co., Ltd., a static contact angle was measured after 5 seconds since dropping of pure water of 10 μL on the functional membrane under an environment of 23° C. and 50% RH was started, and the measured static contact angle was defined as a water contact angle after rubbing. When a difference between the initial water contact angle and the water contact angle after rubbing is 100 or less or when the contact angle after rubbing is 135° or more, it was considered to be practically satisfactory.

<Average Reflectance>

The average optical reflectance within the wavelength 450 to 780 nm of each of the functional membranes produced as above was measured using a USPM-RU which is a spectroscopic reflectance measuring device for a minute region manufactured by Olympus Co., Ltd., and the average reflectance obtained was evaluated according to the following criteria. A, AA, and AAA were judged to be practically feasible.

(Criteria)

AAA: The average optical reflectance is 1.0% or less

AA: The average optical reflectance is more than 1% and 3.0% or less

A: The average optical reflectance is more than 3.0% and 5.0% or less

TABLE II

| *2 | Base material | *1 | Mohs hardness X of uneven layer | Material of uneven layer | The number of stairs Y | Formula (I): X × Y | The number of times of forming masks | The number of times of etching | Reflectance adjustment layer |
|---|---|---|---|---|---|---|---|---|---|
| 1 | TAFD5G | 265 | 8 | $SiO_2$ | 2 | 16 | 1 | 1 | $Al_2O_3$ |
| 2 | White plate | 238 | 8 | $SiO_2$ | 2 | 16 | 1 | 1 | *3 |
| 3 | TAFD5G | 220 | 8 | $SiO_2$ | 2 | 16 | 1 | 1 | $Al_2O_3$ |
| 4 | White plate | 193 | 8 | $SiO_2$ | 2 | 16 | 1 | 1 | *3 |
| 5 | White plate | 162 | 8 | $SiO_2$ | 2 | 16 | 1 | 2 | *3 |
| 6 | Si | 187 | 8 | $SiO_2$ | 2 | 16 | 1 | 1 | ZnS |
| 7 | SiC | 195 | 13 | SiC | 1 | 13 | 1 | 1 | *3 |
| 8 | PC | 175 | 8 | $SiO_2$ | 2 | 16 | 1 | 1 | *3 |
| 9 | White plate | 182 | 8 | $SiO_2$ | 2 | 8 | 1 | 1 | *3 |

*1: Average height from lowest bottom surface of protruding portions of lowermost stair to highest top surface of protruding portions of uppermost stair (Total average height H) [nm]

*2: Functional membrane No.

*3: Non-presence

TABLE III

| *1 | Refractive index Base material | *2 | Uneven layer | *3 | Material of water repellent film | Material of mask | Self-assembly promoting compound | *6 | Anisotropic etching Time [min] | Isotropic etching Time [min] |
|---|---|---|---|---|---|---|---|---|---|---|
| 1 | 1.84 | 1.63 | 1.49 | *4 | UD120 | Ag | *5 | — | 120 | 40 |
| 2 | 1.5 | — | 1.49 | *4 | UD120 | Ag | *5 | — | 120 | 40 |
| 3 | 1.84 | 1.63 | 1.49 | *4 | UD120 | Ag | NaCl | 35 | 120 | 40 |
| 4 | 1.5 | — | 1.49 | *4 | UD120 | Ag | NaCl | 35 | 120 | 40 |
| 5 | 1.5 | — | 1.49 | *4 | UD120 | Ag | *5 | — | 120 × 2 times | *5 |
| 6 | 3.42 | 2.35 | 1.49 | *4 | UD120 | Ag | *5 | — | 120 | 40 |
| 7 | 2.64 | — | 2.64 | *4 | UD120 | Ag | *5 | — | 120 | 40 |
| 8 | 1.58 | — | 1.49 | *4 | UD120 | Ag | NaF | 4 | 120 | 40 |
| 9 | 1.5 | — | 1.49 | *5 | UD120 | Ag | *5 | — | 60 | *5 |

*1: Functional membrane No.
*2: Reflectance adjustment layer
*3: Presence or non-presence of mesh shape
*4: Presence
*5: Non-presence
*6: Hygroscopicity (solubility) [g/100 mL]

TABLE IV

| Functional membrane No. | Evaluation Contact Angle (Initial) [Degree] | Contact angle (afterrubbing test) [degree] | Average reflectance | Note |
|---|---|---|---|---|
| 1 | 155 | 148 | AAA | Present invention |
| 2 | 153 | 148 | AAA | Present Invention |
| 3 | 148 | 145 | AAA | Present invention |
| 4 | 147 | 144 | AAA | Present invention |
| 5 | 145 | 141 | AAA | Present Invention |
| 6 | 150 | 146 | A | Present Invention |
| 7 | 150 | 139 | A | Present invention |
| 8 | 146 | 142 | AAA | Present invention |
| 9 | 147 | 121 | AAA | Comparative Example |

As can be seen from the above results, the functional membrane of the present invention has excellent rub resistance and super water repellency in comparison with the functional membrane of the comparative example even when the number of times of forming the masks is less, thereby reducing the cost. Further, even when refractive index of the base material is higher as in the case of using Si or SiC as the base material, by providing the reflectance adjustment layer it is possible to manufacture a functional membrane having a low reflectance in addition to having excellent rub resistance and super water repellency.

The mechanism of expression or action of the effects of the present invention has not been clarified, but it is presumed as follows.

In order to solve the above problem and to ensure mass productivity, it has been found that it is preferable to satisfy the following conditions.

1) In order to prevent light scattering, it is necessary to have random unevenness having a size of 1 μm or less.
2) In order to prevent degradation due to rub resistance test, a mesh structure that prevents structure breakage thereof is provided.
3) The mask forming step is performed once.
4) In order to achieve super water repellency, it is necessary to control the uneven size, pitch, and depth.
5) In order to increase rub resistance, the uneven portion is made of an inorganic material, and is formed by combining dry film forming and etching.
6) To reduce the cost, the mask exposure process is eliminated and a self-assembled mask is utilized.

In order to satisfy the above conditions, it was required that the relation between the number of stairs (Y) of the protruding portions of the fine uneven structure on the functional membrane and Mohs hardness (X) of the inorganic substance contained as the main component should satisfy the above-mentioned particular conditions. In addition, an average height from the lowest bottom surface of the protruding portions of the lowermost stair to the highest top surface of the protruding portions of the uppermost stair was configured to be within the above-mentioned particular range. By doing so, it is inferred that an aspect ratio of the uneven structure can be controlled, and both super water repellency and rub resistance can be achieved, and mass productivity can be secured.

That is, the fine uneven structure improves water repellency. In particular, the uneven structure having the protruding portions having a shape of two stairs or more can decrease an aspect ratio of each stair, and prevent structural breakage due to degradation caused by rub resistance tests. On the other hand, the fine uneven structure having the protruding portions having a one-stair shape is excellent in water repellency, and further its Mohs hardness satisfying the above formula (I) can prevent breakage thereof since the Mohs hardness. As described above, both rub resistance and super water repellency can be achieved.

Further, the fine uneven structure of the functional membrane is formed via a step of forming a mask on an inorganic material layer and processing the inorganic material layer by dry etching. That is, the mask forming step is performed only once, which leads to cost reduction and makes it possible to achieve mass production.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A manufacturing method of a functional membrane which contains an inorganic material and has a fine uneven structure on a surface thereof, comprising:

a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 175 nm or more and 1 μm or less:

$$10 \leqq X \times Y. \qquad \text{Formula (I)}$$

.

2. The manufacturing method of a functional membrane according to claim 1, further comprising a step of forming a reflectance adjustment layer made of a material different from a material of an uneven layer having the fine uneven structure, between a base material and the uneven layer.

3. The manufacturing method of a functional membrane according to claim 2, wherein a refractive index in the functional membrane is increased in the order of the uneven layer, the reflectance adjustment layer, and the base material.

4. The manufacturing method of a functional membrane according to claim 1, wherein at least a part of the plurality of protruding portions are formed in a mesh shape when the fine uneven structure is viewed from a top surface thereof.

5. The manufacturing method of a functional membrane according to claim 1, wherein a water-repellent film which contains a water-repellent material and has a contact angle of 110 degrees or more with water under a condition of 23° C. and 50% RH is formed on an outermost top surface of the functional membrane.

6. A manufacturing method of a functional membrane which contains an inorganic material and has a fine uneven structure on a surface thereof, comprising:

a single mask forming step, and an etching step, wherein a plurality of protruding portions which constitute the fine uneven structure are formed in a stair shape having one or more stairs in a vertical cross-sectional shape of the functional membrane along a thickness direction of the functional membrane, when Mohs hardness of the inorganic material is denoted as X and the number of the stairs of the protruding portions is denoted as Y, following formula (I) is satisfied, and an average height from the lowest bottom surface of the protruding portions of the lowermost stair to the highest top surface of the protruding portions of the uppermost stair is 1 μm or less;

$$10 \leqq X \times Y; \text{ and} \qquad \text{Formula (I)}$$

wherein a main component of the mask is a metal, before forming the mask, a compound that reacts with the metal is disposed on a layer that will be adjacent to the mask, and the mask is formed such that the mask has contact with the compound that reacts with the metal.

7. The manufacturing method of a functional membrane according to claim 6, wherein the compound that reacts with the metal contains sodium (Na).

8. The manufacturing method of a functional membrane according to claim 6, wherein the compound that reacts with the metal has hygroscopicity.

9. The manufacturing method of a functional membrane according to claim 1, wherein in the etching step, an anisotropic etching condition and an isotropic etching condition are combined.

10. The manufacturing method of a functional membrane according to claim 1, wherein the number (integer Y) of the stairs of the protruding portions is 2.

* * * * *